United States Patent
Oga

(10) Patent No.: US 8,880,077 B2
(45) Date of Patent: Nov. 4, 2014

(54) MOBILE STATION, A MOBILE RADIO COMMUNICATION SYSTEM, AND A MOBILE RADIO COMMUNICATION METHOD

(75) Inventor: Toshiyuki Oga, Tokyo (JP)

(73) Assignee: NEC Corporation, Tokyo (JP)

( * ) Notice: Subject to any disclaimer, the term of this patent is extended or adjusted under 35 U.S.C. 154(b) by 576 days.

(21) Appl. No.: 12/864,566

(22) PCT Filed: Feb. 5, 2009

(86) PCT No.: PCT/JP2009/052348
§ 371 (c)(1),
(2), (4) Date: Jul. 26, 2010

(87) PCT Pub. No.: WO2009/099247
PCT Pub. Date: Aug. 13, 2009

(65) Prior Publication Data
US 2010/0311424 A1 Dec. 9, 2010

(30) Foreign Application Priority Data
Feb. 8, 2008 (JP) ................................. 2008-029605

(51) Int. Cl.
*H04W 36/00* (2009.01)
*H04B 1/7113* (2011.01)
*H04W 36/32* (2009.01)

(52) U.S. Cl.
CPC ............. *H04W 36/32* (2013.01); *H04B 1/7113* (2013.01)
USPC ...................... 455/440; 455/67.11; 455/226.1

(58) Field of Classification Search
USPC .................. 455/436–444, 67.11, 226.1–226.3
See application file for complete search history.

(56) References Cited

U.S. PATENT DOCUMENTS 5,577,047 A * 11/1996 Persson et al. ................ 370/333
6,522,888 B1 * 2/2003 Garceran et al. ........... 455/456.3
(Continued)

FOREIGN PATENT DOCUMENTS

| JP | 10-28285 A | 1/1998 |
| JP | 11-75264 A | 3/1999 |

(Continued)

OTHER PUBLICATIONS

International Search Report for PCT/JP2009/052348 mailed Apr. 28, 2009.

*Primary Examiner* — Temica M Beamer
(74) *Attorney, Agent, or Firm* — Sughrue Mion, PLLC

(57) ABSTRACT

In a mobile radio communication method in which a mobile station moves among a plurality of base stations at high speed, in order to solve a problem of increase in the amount of operation and its related increase in the amount of power consumption and heat emission which is resulted for maintaining good communication quality of communication by the mobile station which moves at high speed to the direction for approaching the base station or moving away from it, it provides detecting means for detecting changes in relative positions to a plurality of base stations, and selecting means for selecting an uplink signal reception base station which receives an uplink signal and selecting one or plural base stations, fluctuation of increase and decrease of which of distance from own mobile station is an opposite manner compared with a case of the uplink signal receiving base station, based on changes in the relative positions detected by said detecting means as a downlink signal transmission base station which transmits a downlink signal.

21 Claims, 12 Drawing Sheets

(56) References Cited

U.S. PATENT DOCUMENTS

| | | | |
|---|---|---|---|
| 6,539,237 B1 * | 3/2003 | Sayers et al. | 455/555 |
| 6,564,057 B1 * | 5/2003 | Chun et al. | 455/437 |
| 6,801,511 B2 * | 10/2004 | Park | 370/331 |
| 7,194,275 B2 * | 3/2007 | Bolin et al. | 455/456.6 |
| 2004/0121774 A1 * | 6/2004 | Rajkotia et al. | 455/441 |

FOREIGN PATENT DOCUMENTS

| | | |
|---|---|---|
| JP | 2000269881 A | 9/2000 |
| JP | 2001157263 A | 6/2001 |
| JP | 2004104223 A | 4/2004 |
| JP | 2004333403 A | 11/2004 |

* cited by examiner

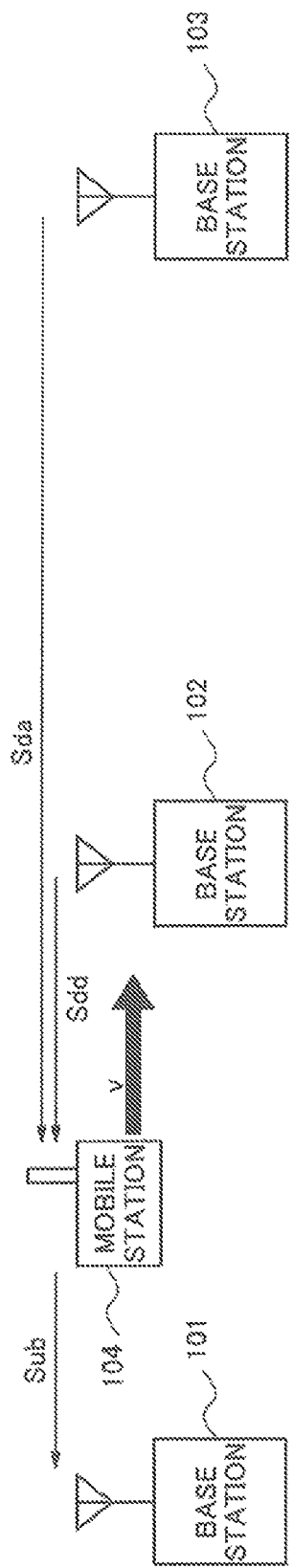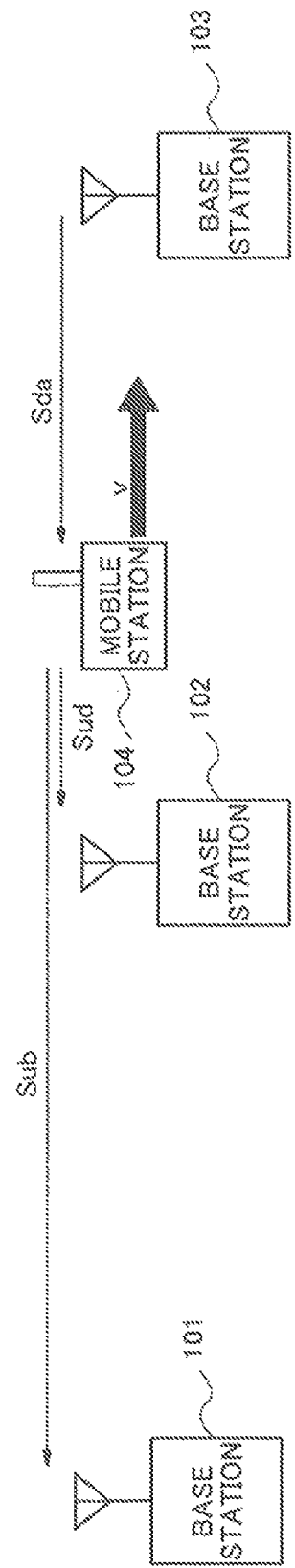

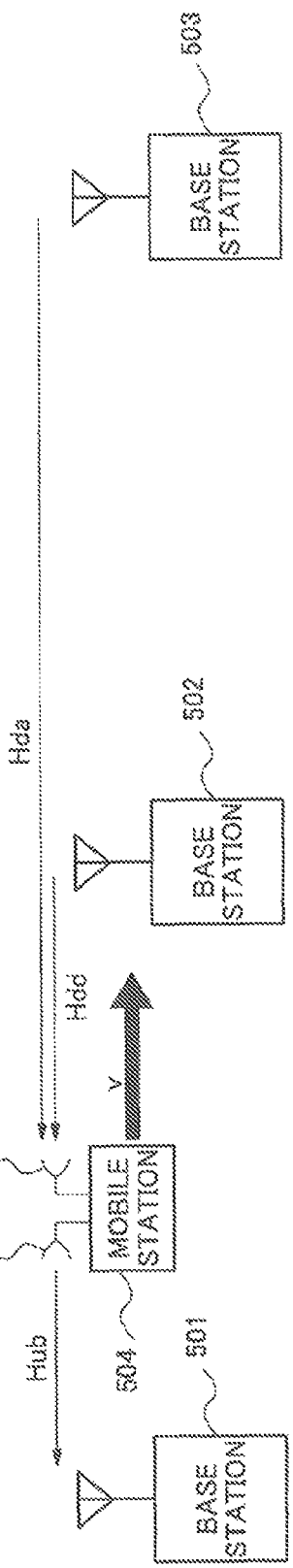
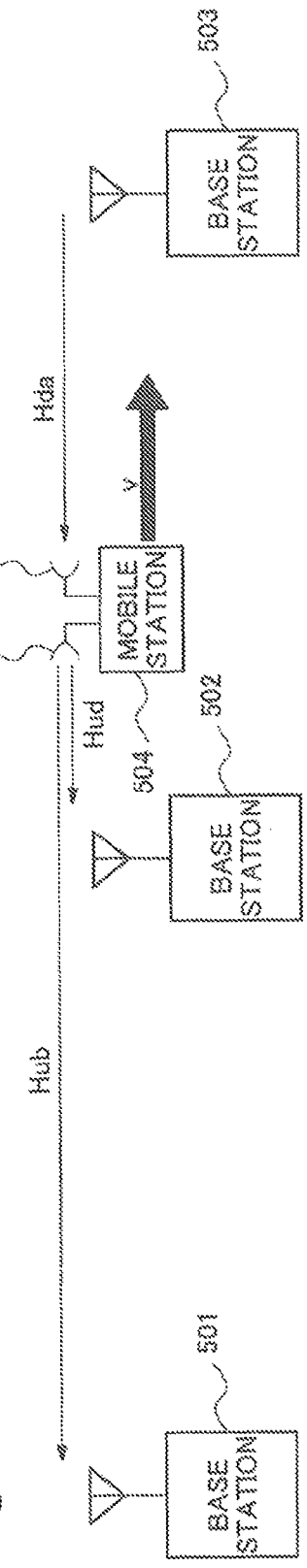

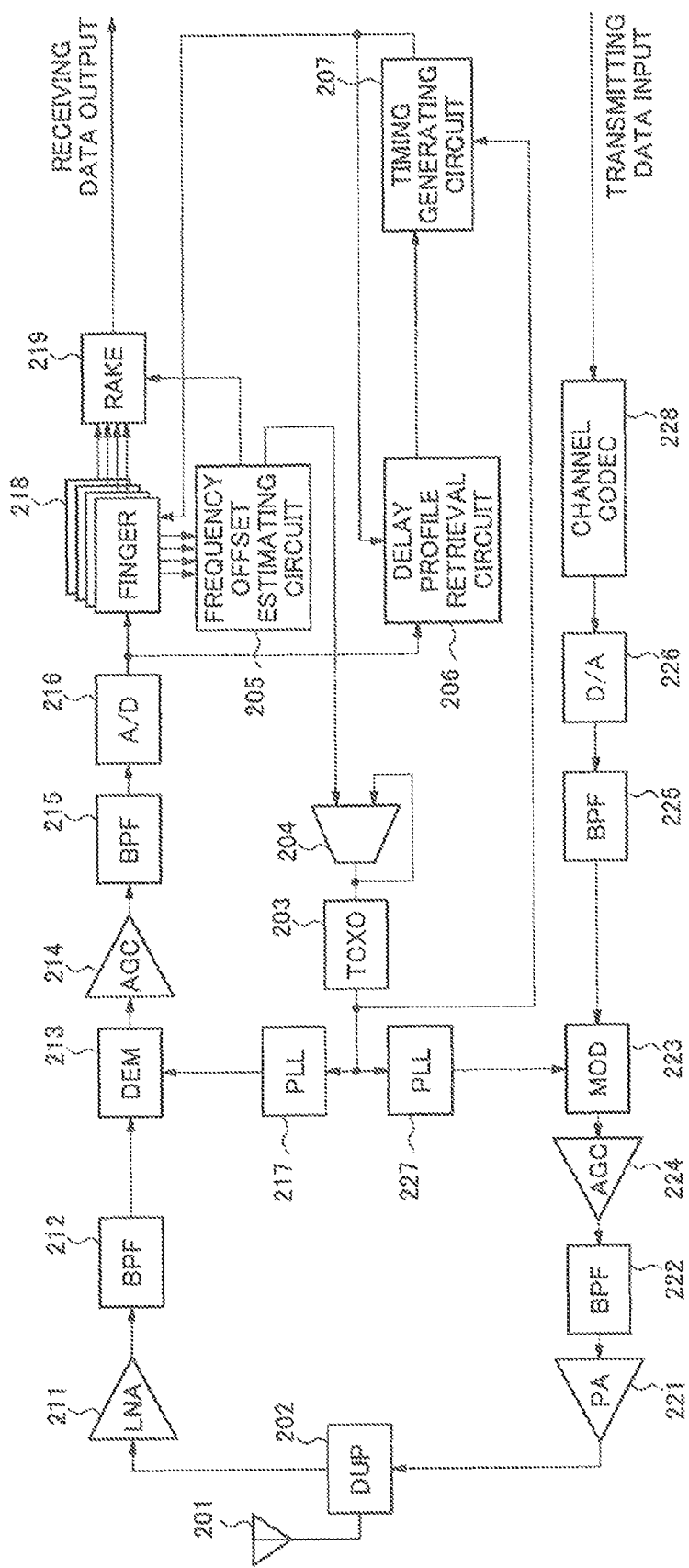

MOBILE STATION, A MOBILE RADIO COMMUNICATION SYSTEM, AND A MOBILE RADIO COMMUNICATION METHOD

This application is the National Phase of PCT/JP2009/052348, filed Feb. 5, 2009, which claims priority from Japanese Patent Application No. 2008-029605, filed on Feb. 8, 2008, the contents of which are incorporation herein by reference in their entirety.

TECHNICAL FIELD

The present invention relates to a mobile station which moves among a plurality of base stations, a mobile radio communication system which includes these base stations and mobile stations, a mobile radio communication method and a mobile radio communication program in this mobile radio communication system.

BACKGROUND ART

In a mobile radio communication system, like a cellular phone communication system, which communicates between a base station fixed on the ground and a mobile station having a relative speed to the base station, the mobile station makes a frequency of the reference clock which is equipped in the mobile station follow a frequency of the base station reference clock which is superposed on a signal (a downlink signal) from the base station to the mobile station (frequency capture and frequency following). And, the mobile station performs signal processing of the downlink signal based on the reference clock following the base station reference clock. Also, the mobile station creates a signal (an uplink signal) to the base station using the same reference clock and transmits that to the base station.

As an example of a mobile station used in this kind of mobile radio communication system, a cellular phone, which adopts a CDMA (Code Division Multiple Access) system and a WCDMA (Wideband Code Division Multiple Access) system described in Japanese Patent Application Publication No. 2001-157263, Japanese Patent Application Publication No. 2000-269881, Japanese Patent Application Publication No. 2004-104223, or Japanese Patent Application Publication No. 2004-333403, is known (hereinafter, it is also simply referred to a CDMA system cellular phone and a WCDMA system cellular phone).

First, as the first related art, the CDMA system cellular phone described in Japanese Patent Application Publication No. 2001-157263 or the like will be described with reference to FIG. 10.

The CDMA system cellular phone includes an antenna 1, a low noise amplifier 2, a down-converter 3 of heterodyne system and an RXAGC (Receiver Automatic Gain Control) amplifier 4 as shown in FIG. 10. The CDMA system cellular phone also includes a quadrature demodulator (DEM) 5, an A/D (analog/digital) converter 6, a PLL (Phase Locked Loop) 7 and a reference clock generator (TCXO (Temperature Compensated Crystal Oscillator)) 8. Also, the CDMA system cellular phone includes a delay profile searcher 9, a finger circuit 10, a timing generator 11, a frequency offset estimator 12, a RAKE circuit 13, a speech processor 14, a codec circuit 15, a speaker 16 and an accumulator 17. The CDMA system cellular phone also includes a microphone 18, a channel codec 19, a D/A (digital/analog) converter 20, a quadrature modulator (MOD) 21, a TXAGC (Transmitter Automatic Gain Control) amplifier 22, an up-converter 23 and a power amplifier 24.

Next, each part will be described. The PLL 7 generates local frequency signals for the down-converter 3, the up-converter 23, the quadrature demodulator 5 and the quadrature modulator 21 by using output of the reference clock generator 8 as a reference clock. A receiving signal received at the antenna 1, as a downlink signal from a base station, is converted into an intermediate frequency signal in the down-converter 3 after amplified in the low noise amplifier 2. After level control is performed in the RXAGC amplifier 4, the converted intermediate frequency signal is converted into a reception analog baseband signal by quasi-synchronous demodulation in the quadrature demodulator 5. The reception analog baseband signal is further converted into a reception digital baseband signal in the A/D converter 6, and the converted reception digital baseband signal is input to the delay profile searcher 9 and the finger circuit 10. Here, a base station reference clock from a base station is superposed on the reception digital baseband signal.

The delay profile searcher 9 generates a frame timing correction time for the reception digital baseband signal input sequentially, based on a frame timing signal given from the timing generator 11, and outputs the frame timing correction time to the timing generator 11. The timing generator 11 generates an ideal frame timing signal by using the reference clock output by the reference clock generator 8. And, the timing generator 11 generates the frame timing signal by performing correction with the addition of the frame timing correction time to the ideal frame timing signal, and supplies the frame timing signal to the delay profile searcher 9 and the finger circuit 10. When the frame timing signal is input newly, the delay profile searcher 9 calculates a difference in timing and supplies this to the timing generator 11 as a new frame timing correction time. By repeating such correction process, an accurate frame timing signal is always supplied to the delay profile searcher 9 and the finger circuit 10.

The finger circuit 10 includes a plurality of fingers for separating receiving signals being dispersed and delayed in multipath components. The finger circuit 10 demodulates the reception digital baseband signal in each finger, based on the input frame timing signal, and sends the outputs of the fingers to the RAKE circuit 13. The finger circuit 10 also extracts pilot data included in the reception digital baseband signal with respect to each finger, and outputs to the frequency offset estimator 12. The frequency offset estimator 12 calculates a frequency offset value for each finger, based on the pilot data with respect to each finger input from the finger circuit 10, and to outputs the frequency offset value for each finger to the RAKE circuit 13. By performing weighted synthesis of the output signals with respect to each finger from the finger circuit 10, which is based on the frequency offset value with respect to each finger input from the frequency offset estimator 12, the RAKE circuit 13 generates reception demodulated data in which the fading effect has been reduced. The generated reception demodulated data is input to the speech processor 14, and further, that is decoded by the speech processor 14. The decoded output is input to the codec circuit 15. The codec circuit 15 converts the output of the speech processor 14 into an analog signal, and outputs that from the speaker 16 as sound.

The frequency offset estimator 12 also performs weighted synthesis of the frequency offset value for each finger of the finger circuit 10 and outputs that to the accumulator 17 as a synthetic frequency offset value. The accumulator 17 adds the input synthetic frequency offset value and the present output value, and outputs the addition result to a frequency control terminal of the reference clock generator 8. The reference clock generator 8 changes an oscillation frequency according to the output value of the accumulator 17 which is input to the frequency control terminal. In this way, the output frequency of the reference clock generator 8 follows the reference clock frequency from a base station which is superposed on a receiving signal and changes (frequency capture and frequency following).

On the other hand, a voice signal input from the microphone 18 is converted by the codec circuit 15 into a digital signal, and the converted signal is encoded in the speech processor 14, and the encoded signal is input to the channel codec 19 as transmitting data. The transmitting data is converted by the D/A converter 20 into a transmission analog baseband signal after encoded by the channel codec 19, and is further modulated to an intermediate frequency signal by the quadrature modulator 21. The intermediate frequency signal is converted by the up-converter 23 into a transmitting frequency after being amplified in the TXAGC (Transmitter Automatic Gain Control) amplifier 22. The converted signal with transmitting frequency is transmitted from the antenna 1 as a transmitting signal after further amplified by the power amplifier 24.

As mentioned above, a local frequency signal supplied to the quadrature modulator 21 and a local frequency signal supplied to the up-converter 23 are generated by the PLL 7 which uses output of the reference clock generator 8 as a reference clock. Accordingly, a frequency of the transmitting signal will also change according to the output frequency of the reference clock generator 8, in other words, it will also follow the reference clock frequency from a base station which is superposed on a receiving signal.

Next, as the second related art, the WCDMA system cellular phone by a direct conversion system will be described with reference to FIG. 11.

As shown in FIG. 11, the WCDMA system cellular phone includes an antenna 201, a duplexer (DUP) 202 for performing simultaneous sending and receiving using the single antenna 201, a reference clock generator (TCXO) 203 and an accumulator 204. The WCDMA system cellular phone also includes a frequency offset estimator 205, a delay profile searcher 206, a timing generator 207, a low noise amplifier (LNA) 211 and band-pass filters (BPF) 212, 222, 215 and 225. The WCDMA system cellular phone further includes a quadrature demodulator (DEM) 213, AGC amplifiers 214, 224, an A/D converter 216, PLLs 217, 227, a finger circuit 218, a RAKE circuit 219, a power amplifier (PA) 221, a quadrature modulator (MOD) 223 and a D/A converter 226. The WCDMA system cellular phone further more includes a channel codec 228, and a speech processor, a codec circuit, a speaker and a microphone which are not illustrated.

Here, a receiving circuit is composed of the low noise amplifier 211, the band-pass filter 212, the quadrature demodulator 213, the AGC amplifier 214, the band-pass filter 215, the A/D converter 216, the finger circuit 218, the RAKE circuit 219 and the frequency offset estimator 205. The receiving circuit is also composed of the delay profile searcher 206, the timing generator 207, the accumulator 204, the reference clock generator 203 and the PLL 217.

A transmitting circuit is composed of the channel codec 228, the D/A converter 226, the band-pass filter 225, the quadrature modulator 223, the AGC amplifier 224, the band-pass filter 222, the power amplifier 221, the accumulator 204, the reference clock generator 203 and the PLL 227.

First, each part which composes the receiving circuit will be described. As shown in FIG. 11, the PLL 217 generates a local frequency signal for the quadrature demodulator 213 using output of the reference clock generator 203 as a reference clock. A receiving signal, received at the antenna 201 as a downlink signal (a reception high-frequency signal) from a base station, is led to the receiving circuit by the duplexer 202. In the receiving circuit, the receiving signal is amplified by the low noise amplifier 211. And, among amplified signals, only a high-frequency signal in a required bandwidth is selected by the band-pass filter 212. After that, in the quadrature demodulator 213, the quasi-synchronous demodulation is performed with a local frequency signal supplied from the PLL 217, and the selected high-frequency signal is converted into a reception analog baseband signal. And, the converted reception analog baseband signal is converted into a reception digital baseband (a reception DBB) signal in the A/D converter 216. The converted reception digital baseband signal is input to the delay profile searcher 206 and the finger circuit 218. Here, a reference clock from a base station is superposed on the reception digital baseband signal.

Also, the delay profile searcher 206 compares a frame timing signal given from the timing generator 207 and the input reception digital baseband signal, generates a frame timing correction time and outputs that to the timing generator 207. The timing generator 207 generates an ideal frame timing signal by using the reference clock output by the reference clock generator 203. And, the timing generator 207 generates the frame timing signal, by performing correction adding the frame timing correction time input from the delay profile searcher 206 to the generated ideal frame timing signal, and supplies the frame timing signal to the delay profile searcher 206 and the finger circuit 218. When the frame timing signal is input newly, the delay profile searcher 206 calculates a difference in timing and supplies that to the timing generator 207 as a new frame timing correction time. By repeating such correction process, an accurate frame timing signal is always supplied to the delay profile searcher 206 and the finger circuit 218.

The finger circuit 218 includes a plurality of fingers for separating receiving signals being dispersed and delayed in multipath components. The finger circuit 218 demodulates the reception digital baseband signal in each finger, based on the corrected frame timing signal, and sends outputs of the fingers to the RAKE circuit 219. The finger circuit 218 also extracts pilot data included in the reception digital baseband signal with respect to each finger, and outputs to the frequency offset estimator 205. The frequency offset estimator 205 calculates a frequency offset value for each finger, based on the pilot data with respect to each finger input from the finger circuit 218, and outputs the frequency offset value for each finger to the RAKE circuit 219. By performing weighted synthesis of the output signal for each finger from the finger circuit 218, which is based on the frequency offset value for each finger input from the frequency offset estimator 205, the RAKE circuit 219 generates a reception demodulated data. As a result, the reception demodulated data in which the fading effect has been reduced is generated.

The frequency offset estimator 205 also performs weighted synthesis of the frequency offset value for each finger of the finger circuit 218 and outputs that to the accumulator 204 as a synthetic frequency offset value. The accumulator 204 adds the input synthetic frequency offset value and the present output value, and outputs the addition result to a frequency control terminal of the reference clock generator 203. The reference clock generator 203 changes an oscillation frequency according to the output value of the accumulator 204 which is input to the frequency control terminal. In this way, the output frequency of the reference clock generator 203 follows the reference clock frequency from a base station which is superposed on a receiving signal and changes (frequency capture and frequency following).

Next, each part which composes the transmitting circuit will be described. The PLL 227 generates a local frequency signal for the quadrature modulator 223 by using output of the reference clock generator 203 as a reference clock. Transmitting data is converted by the D/A converter 226 into a transmission analog baseband signal after encoded by the channel codec 228. Further, the transmission analog baseband signal is converted into a transmission signal, as an uplink signal (a transmission high-frequency signal), with a local frequency signal supplied from the PLL 227 in the quadrature modulator 223. The transmission signal is led to the antenna 201 by the duplexer 202 after amplified by the AGC amplifier 224 and the power amplifier 221. And, the transmission signal is transmitted from the antenna 201 as an uplink signal (a transmission high-frequency signal) from the mobile station to a base station.

According to aforementioned constitution, because a local frequency signal supplied to the quadrature modulator 223 is generated by the PLL 227 which uses output of the reference clock generator 203 as a reference clock, a frequency of the uplink signal (the transmission high-frequency signal) also changes according to the output frequency of the reference clock generator 203. Therefore, a frequency of the uplink signal (the transmission high-frequency signal) can follow the reference clock frequency from a base station which is superposed on the reception high-frequency signal (a downlink signal).

In a mobile radio communication system, the quasi-synchronous demodulation is performed for a receiving signal at both of a base station and a mobile station. And, because the mobile station makes its own reference clock frequency follow the reference clock frequency from the base station on communicating as mentioned above, any difference in frequency in bidirectional data communication of reception and transmission between the base station and the mobile station can be suppressed. As a result, speeding up of signal demodulation processing after quasi-synchronous demodulation of the receiving signal can be achieved, and improvement of the signal transmission throughput can also be achieved.

The reference clock generator used in the base station is more stable under temperature change and vibration than the one used in the mobile station. This is the reason why the reference clock frequency of the mobile station is configured to follow the receiving signal (a downlink signal) frequency from the base station. It is to improve frequency stability of the entire system that the mobile station makes its own reference clock frequency follow the receiving (downlink) signal frequency which is generated based on the reference clock in the base station.

Next, Doppler effect which occurs when a mobile station moves at high speed like a mobile radio communication system, and its influence will be described.

First, the basis of Doppler effect will be described. When an electromagnetic source is moving at speed v [m/s] in the direction of angle θ seen from an observer, frequency f [Hz] of an electromagnetic wave observed by the observer is expressed in the following formula.

$$f = \frac{\sqrt{1-(v/c)^2}}{1-(v/c)\cos\theta} f_0 \tag{1}$$

Here, fo is a frequency of the electromagnetic wave oscillated by the electromagnetic source, v is the moving speed of the electromagnetic source seen from the observer, c is light speed, and θ is an angle of the moving direction of the electromagnetic source seen from the observer.

It makes θ=0 where the case that the electromagnetic source is coming toward the observer. The frequency f at this time is calculated by substituting θ=0 in the formula (1), and the result becomes as follows.

$$f = \frac{\sqrt{1-(v/c)^2}}{1-(v/c)} f_0 = \frac{\sqrt{1+(v/c)}}{\sqrt{1-(v/c)}} f_0 \tag{2}$$

Here, if it is given v<<c, it can be approximated as below.

$$\sqrt{1-(v/c)^2} \approx 1 \tag{3}$$

That is, the formula (2) can be approximated by the formula (4) as below.

$$f = \frac{\sqrt{1+(v/c)}}{\sqrt{1-(v/c)}} f_0 = \frac{1+(v/c)}{\sqrt{1-(v/c)^2}} f_0 \approx [1+(v/c)]f_0 \tag{4}$$

Further, in the following description, the influence of Doppler effect is described using the formula (1) or it is described using the approximate formula (4) for easiness.

Next, the influence of Doppler effect to a mobile radio communication system will be described.

For example, as shown in FIG. 12A, it is supposed that three base stations 901, 902 and 903 are arranged from the left side in the figure by this order on one-dimensional space. These base stations 901, 902 and 903 are base stations which transmit downlink signals in all identical frequency fo [Hz].

As shown in FIG. 12A, a mobile station 904 is locating between the base station 901 and the base station 902, and it is supposed that it moves away from the base station 901 at high speed of speed v [m/s] and it comes closer to the base stations 902 and 903 at same high speed. In this case, in the mobile station 904, it is observed as if the downlink signal frequency fo [Hz] from each base stations 901, 902 and 903 were changing as shown in FIG. 12B due to Doppler effect. That is, when seeing from the mobile station 904 which is moving away, the downlink signal frequency fo from the base station 901 is observed as if shifting to decreased direction. At that time, when the approximate formula (4) is used, the downlink signal frequency fb [Hz] from the base station 901 observed at the mobile station 904 is represented by the following formula (5) and FIG. 12B. On the other hand, when seeing from the mobile station 904 which is approaching the base station 902 at high speed, the downlink signal frequency fo from the base station 902 is observed as if shifting to increased direction. At that time, when the approximate formula (4) is used similarly, the downlink signal frequency fd [Hz] from the base station 902 observed at the mobile station 904 is represented like the following formula (6) and FIG. 12B. Similarly, when seeing from the mobile station 904 which is approaching, the downlink signal frequency fo from the base station 903 is observed as if shifting to the increased direction. At that time, the downlink signal frequency fa [Hz]

from the base station 903 observed at the mobile station 904 is also represented like the formula (6) and FIG. 12B.

$$fb=(1-v/c) \cdot fo \quad (5)$$

$$fd=fa=(1+v/c) \cdot fo \quad (6)$$

where, c is light speed.

In other words, a frequency of a downlink signal from a base station observed at a mobile station increases or decreases by v/c of frequency ratio compared with a frequency of a downlink signal received during a time of static condition. As a result, the reference clock frequency inside the mobile station also changes by v/c of the same frequency ratio in the configuration of the mobile radio communication system in which the reference clock to frequency of the mobile station follows the reference clock frequency of the base station as mentioned above.

Further, transmitting and receiving an uplink signal and a downlink signal are generally performed by using the same base station in a mobile radio communication system. For this reason, under the system which uses a receiving signal quasi-synchronous demodulation system, when frequency shift by v/c of frequency ratio due to Doppler effect occurs to a downlink signal, the frequency shift by further equivalent amount of frequency in an uplink signal is observed at a base station. It will be described specifically with reference to FIG. 12A about this. As shown in FIG. 12A, it is supposed that the mobile station 904 which is approaching the base station 902 at high-speed of v [m/s] is receiving a downlink signal from the base station 902. At this time, the reference clock frequency inside the mobile station 904 is increasing (1+v/c) times of the reference clock frequency at a time of static condition due to Doppler effect.

The mobile station 904 generates an uplink signal in this state. Transmitting frequency from the mobile station side changes according to the output frequency of the reference clock generator. Therefore, the uplink signal whose transmitting frequency is increased by (1+v/c) times of the transmitting frequency at a time of static condition is generated. When the base station 902 receives the uplink signal whose frequency is being increased by (1+v/c) times of a frequency at a time of static condition, a frequency which is further increased by (1+v/c) times is observed at the base station 902 because Doppler effect also influences to an uplink direction. In other words, when the mobile station 904 is approaching the base station 902 at high speed (v [m/s]), a frequency having (1+v/c) squared times of the frequency fo, which is observed at the base station 902 when the mobile station 904 is in a static condition, is observed at the base station 902.

The influence by Doppler effect by a mobile station which is moving at high speed also causes the following phenomenon. That is, it is supposed that the mobile station 904 passed the base station 902, and a positional relationship between the mobile station 904 and the base station 902 has changed from a position directional relation shown in FIG. 12A to a position directional relation shown in FIG. 13A. At that time, frequency shift by Doppler effect suddenly changes to a decreased direction shift in FIG. 13A while it was a increased direction shift in FIG. 12A. The observed frequency fd' at the mobile station 904 when the mobile station 904 has passed the base station 902 is given by the formula (7). At that time, frequency variation Δ fd observed at the mobile station 904 is given by the formula (8).

$$fd'=fb=(1-v/c) \cdot fo \quad (7)$$

$$\Delta fd=-(2 \cdot v \cdot fo)/c \quad (8)$$

Similarly, when a position directional relation between the mobile station 904 and the base station 902 has changed to a relation from FIG. 12A to FIG. 13A, a frequency observed at the base station 902 suddenly changes from (1+v/c)·fo to (1−v/c)·fo. Accordingly, the frequency variation value observed at the base station 902 becomes −(4·v·fo)/c because the frequency variation value of −(2·v·fo)/c observed at the mobile station 904 is added to the variation value from (1+v/c)·fo to (1−v/c)·fo.

DISCLOSURE OF THE INVENTION

Problem to be Solved by the Invention

As mentioned above, in a mobile radio communication system in which a mobile station moves among a plurality of base stations at high speed, frequency shift in an uplink signal observed at a base station occurs due to Doppler effect when the mobile station communicates while moving to the direction for approaching the base station or away from it at high speed. Therefore, in order to maintain good communication quality, the base station needs to perform processing to correct this shift in frequency. However, there was a problem that processing to correct this shift in frequency causes increase in the amount of operation and its related increase in the amount of power consumption and heat emission involved.

The present invention has been made in view of the above-mentioned circumstances, and the object of the present invention is to provide a mobile radio communication system, a mobile radio communication method and a mobile radio communication program which can solve a problem which increases the amount of operation and also increases the amount of power consumption and heat emission involved to maintain the communication quality in a good condition when a mobile station communicates while moving to the direction for approaching a base station or away from it at high speed.

Means for Solving a Problem

The first mobile station of the present invention includes detecting means for detecting changes in relative positions to a plurality of base stations, and selecting means for selecting an uplink signal reception base station which receives an uplink signal and selecting one or plural base stations, fluctuation of increase and decrease of which of distance from own mobile station is an opposite manner compared with a case of the uplink signal receiving base station, based on changes in the relative positions detected by the detecting means, as a downlink signal transmission base station which transmits a downlink signal.

The first mobile radio communication system of the present invention includes a plurality of base stations and a mobile station which communicates with each of the base stations, and is provided with detecting means for detecting changes in relative positions of the mobile station to the plurality of base stations, and selecting means for selecting an uplink signal reception base station which receives an uplink signal and selecting one or plural base stations, fluctuation of increase and decrease of which of distance from the mobile station is an opposite manner compared with a case of the uplink signal receiving base station, based on changes in the relative positions detected by the detecting means, as a downlink signal transmission base station which transmits a downlink signal.

The first mobile radio communication method of the present invention in a plurality of base stations and a mobile station which communicates with each of the base stations, characterized by detecting changes in relative positions of the mobile station to the plurality of base stations, selecting an uplink signal reception base station which receives an uplink signal, and selecting one or plural base stations, fluctuation of increase and decrease of which of distance from the mobile station is an opposite manner compared with a case of the uplink signal receiving base station, based on the detected changes in the relative positions, as a downlink signal transmission base station which transmits a downlink signal.

The first mobile radio communication program of the present invention in a plurality of base stations and a mobile station which communicates with each of the base stations causes a computer to execute a process of detecting changes in relative positions of the mobile station to the plurality of base stations, a process of selecting an uplink signal reception base station which receives an uplink signal, and a process of selecting one or plural base stations, fluctuation of increase and decrease of which of distance from the mobile station is an opposite manner compared with a case of the uplink signal receiving base station, based on the detected changes in the relative positions, as a downlink signal transmission base station which transmits a downlink signal.

Effect of the Invention

According to the composition of the present invention, an effect that can realize communication in a good condition is obtained without causing increase in the amount of operation and its related increase in the amount of power consumption and heat emission involved when a mobile station communicates while moving to the direction for approaching a base station or away from it at high speed.

BRIEF DESCRIPTION OF THE DRAWINGS

FIG. 1A and FIG. 1B are figures illustrating the whole arrangement configuration of a WCDMA communication system which is the first embodiment of the present invention and conditions of mobile communications.

FIG. 5A and FIG. 5B are figures illustrating the whole arrangement configuration of a WCDMA communication system which is the third embodiment of the present invention and conditions of mobile communications.

FIG. 11 is a block diagram showing the electrical configuration of the related WCDMA system cellular phone by a direct conversion system.

DESCRIPTION OF THE CODES

Figure 2:
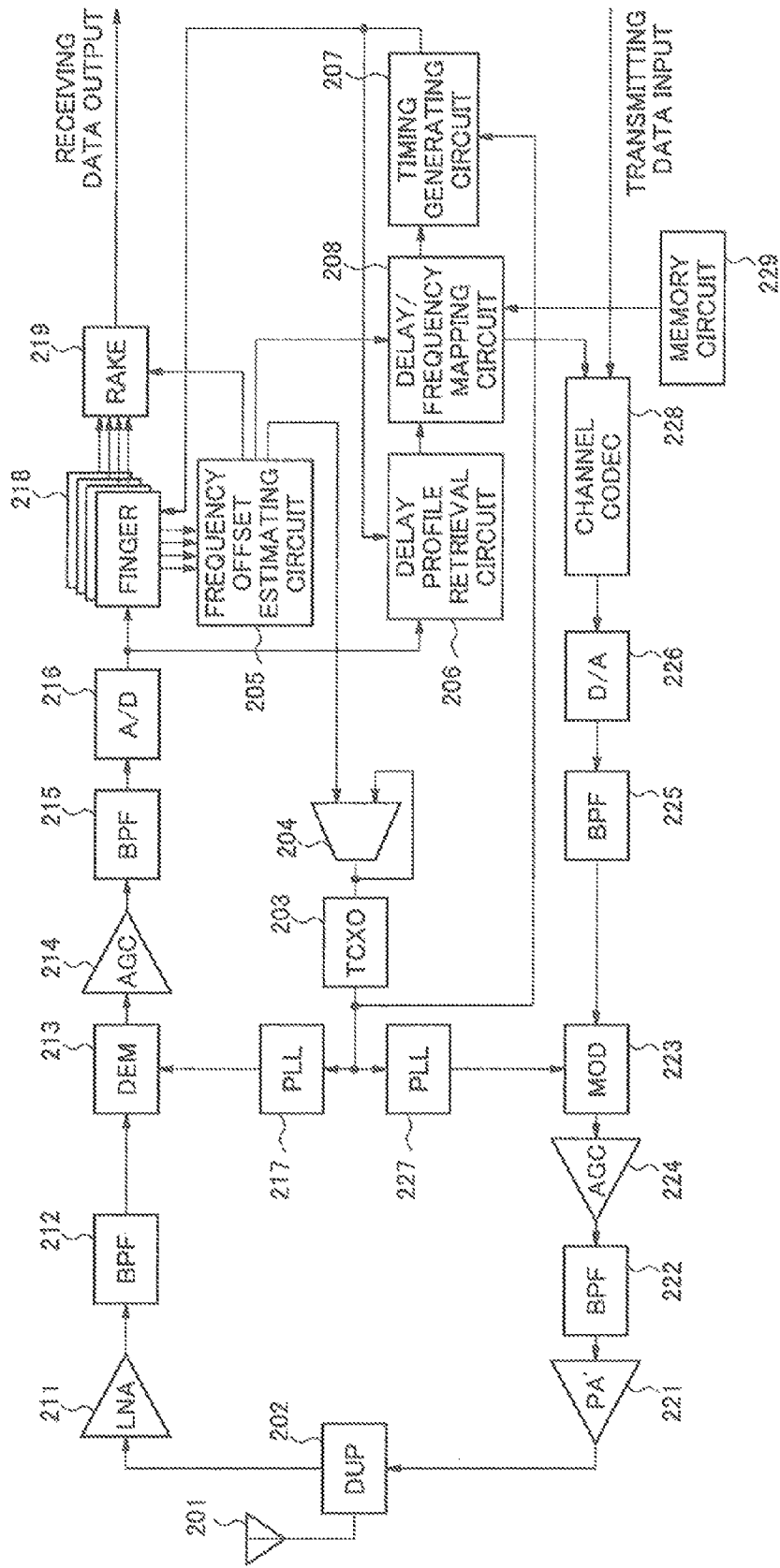
FIG. 2 is a block diagram showing the electrical configuration of the mobile station according to the first embodiment of the present invention.

101, 102, 103, 301, 302, 303, 501, 502, 503, 701, 702 and 703 a base station
104, 304, 504, 704 and 804 a mobile station
Sda, Sdd, Fda, Fdd, Hda and Hdd a downlink signal
Sub, Sud, Fub, Fud, Hub and Hud an uplink signal
201 an antenna
202 a duplexer (DUP)
211 a low noise amplifier (LNA)
212, 222, 215 and 225 a band-pass filter (BPF)
213 a quadrature demodulator (DEM)
214 and 224 an automatic gain control (AGC) amplifier
216 an A/D converter
217 and 227 PLL
218 a finger circuit
219 a RAKE circuit
221 a power amplifier (PA)
223 a quadrature modulator (MOD)
226 a D/A converter
203 a reference clock generator (TCXO)
204 an accumulator
205 and 401 a frequency offset estimator
206 and 404 a delay profile searcher
207 a timing generator
208 a delay/frequency mapper
228 a channel codec
229 a memory
402 a frequency mapper
403 a local frequency setting circuit
201a an antenna having the directivity in the direction of the movement (the first antenna)
201b an antenna having the directivity in the reverse direction of the movement (the second antenna)
805 detecting means
806 selecting means

BEST MODE FOR CARRYING OUT THE INVENTION

First, an outline of a mobile radio communication system according to the embodiment of the present invention will be described. A mobile station selects a base station, which locates a moving course (moving direction) ahead and is relatively approaching, as a downlink signal transmission base station. And, the mobile station receives a downlink signal from the downlink signal transmission base station, and demodulates this. On the other hand, a mobile station designates a base station, which locates behind the moving course and is relatively moving away, as an uplink signal reception base station. And, the mobile station transmits an uplink signal which can be discriminated only by the uplink signal reception base station.

Embodiment 1

Hereinafter, the embodiment of the present invention will be described in detail with reference to the drawings.

FIG. 1A and FIG. 1B are figures illustrating the whole arrangement configuration of a WCDMA mobile radio communication system (hereinafter, for easiness, also referred to as a WCDMA communication system) which is the first embodiment of the present invention and mobile communications conditions. According to this embodiment, as shown in FIG. 1A and FIG. 1B, it is supposed that each of the base stations 101, 102 and 103 is arranged in spaced side-by-side relation to each other on one-dimensional space by this order from the left side in the figure for descriptive reasons. FIG. 1A shows a state of mobile communication condition before the mobile station 104 passes the base station 102 that exists in the route way while moving toward the right side in the figure. FIG. 1B shows conditions of mobile communications after the mobile station 104 has passed the base station 102.

First, conditions of the mobile communications in the position directional relation shown in FIG. 1A will be described.

In this situation, the mobile station 104 is moving to the right side in the figure between the base station 101 and the base station 102 at speed v [m/s]. In other words, while the mobile station 104 is moving away from the base station 101 at high speed of speed v, the mobile station 104 is approaching the base station 102 and the base station 103 at high speed.

The outline of operation when the mobile station 104 receives a downlink signal from a base station will be described in this situation (details will be described later). According to this embodiment 1, it assumes that the mobile station 104 selects a downlink signal from the base station which is locating ahead of the moving course as the downlink signal to be received.

In the WCDMA communication system, the soft handover communication is performed by connecting radio links simultaneously from the mobile station 104 to a plurality of neighboring base stations for preventing intermittent disconnection of communication on the border of the cell. By using this function, in a situation of FIG. 1A, the nearest base station 102 which locates ahead of the moving course generates the downlink signal Sdd in frequency fo [Hz] and transmits to the approaching mobile station 104, also the base station 103 that also locates ahead of the moving course likewise generates the downlink signal Sda in frequency fo and transmits to the approaching mobile station 104.

The mobile station 104 receives the downlink signal Sdd from the nearest base station 102 and receives the downlink signal Sda from the neighboring base station 103. A receiving circuit of the mobile station 104 can select both of the base stations 102 and 103 as a base station which is suitable for transmitting a downlink signal at the time of the soft handover. The receiving circuit of the mobile station 104 may select the base station which is suitable for transmitting a downlink signal as a base station which transmits the downlink signal of better receiving quality by the following method. That is, the mobile station may perform extraction and selection of a downlink signal based on, for example, the strength of the reception signal level. That is, by comparing the strength of the reception signal level, the mobile station estimates the nearest base station or the base station having less radio interferences, and may extract the downlink signal from the estimated base station as the signal to be demodulated. In this case, in a situation of FIG. 1A (apart from the case where there exists disabilities caused by buildings and to geography), the mobile station 104 judges that the downlink signal Sdd from the nearest base station 102 is the downlink signal with the good reception level. As a result, the mobile station 104 selects the base station 102 as the base station which has transmitted the downlink signal to be received. And the mobile station 104 extracts the downlink signal Sdd from the base station 102 and demodulates that.

Also, the mobile station 104 may extract and select a downlink signal using a method of other than above. For example, by comparing a rate of error detection, the mobile station 104 may extract and select a downlink signal. Or, the mobile station 104 holds positional relationship information on (neighboring) base stations 101, 102 and 103 in advance via a network, and may determine a base station to be connected from hour to hour by recognizing a fact that own mobile station is passing by which base station and is approaching which base station (nearest) based on the obtained positional relationship information with base stations and frequency shift by Doppler effect in each receiving signal.

Next, the outline of operation when the mobile station 104 transmits an uplink signal to a base station will be described in a situation of FIG. 1A (details will be described later). According to this embodiment 1, when the uplink signal is transmitted, the mobile station 104 discriminates the base station, which locates behind the moving course of own mobile station and is relatively moving away, and transmits the uplink signal toward the base station. The mobile station 104 discriminates which base station is the base station for transmitting the uplink signal by the following procedures.

In a situation of FIG. 1A, the downlink signals of frequency fo are transmitted to the mobile station 104 from the base stations 102 and 103 which are approaching the mobile station 104, and at the same time, the downlink signal, which is not shown, of frequency fo (identical with the transmitting frequency of the base stations 102 and 103) is also transmitted to the mobile station 104 from the base station 101 which is moving away from the mobile station 104. When the mobile station 104 receives the downlink signal from the base station 101, the mobile station 104 recognizes that frequency shift to lower direction by Doppler effect is occurring in this downlink signal. The mobile station 104 recognizes that the base station 101 is moving away from own mobile station based on this recognition (recognition of a relative position change).

The downlink signal from the base station 101 cannot be a target of selection and demodulation in normal operation because frequency shift to lower direction by Doppler effect is occurring. However, by detecting whether the frequency shift is occurring to lower direction in the downlink signal received from the base station 101 or not, the mobile station 104 judges whether it is a base station suitable for receiving the uplink signal (the uplink signal reception base station) or not. In other words, in a situation shown in FIG. 1A, because frequency shift to lower direction is occurring in the downlink signal received from the base station 101, the mobile station 104 designates the base station 101 as the uplink signal reception base station. And the mobile station 104 transmits the uplink signal Sub to the base station 101. The base station 101 receives the uplink signal Sub (, in which frequency shift to lower direction by Doppler effect is occurring) from the mobile station 104.

The mobile station 104 may discriminate the uplink signal reception base station using a method of other than above. For example, the mobile station 104 holds positional relationship information on neighboring (plural) base stations in a memory circuit 229 in advance via a network, and may determine a base station to be connected from hour to hour by recognizing a fact that own mobile station is moving away from which base station based on the given positional relationship information with base stations.

Next, the conditions of mobile communications will be described for the position directional relation which has changed from the state shown in FIG. 1A to the state shown in FIG. 1B. At that time, a relation between the mobile station 104 and the base station 102 changes to a relation of moving away each other from a relation of approaching each other. In this way, the mobile station 104 is further approaching the base station 103 at high speed of speed v [m/s] in a situation of FIG. 1B. On the other hand, the mobile station 104 is moving away from the base station 101 and the base station 102 at high speed of speed v [m/s].

First, a receiving operation of a downlink signal by a mobile station will be described when the position directional relation and the condition of the mobile communications change from the state shown in FIG. 1A to the state shown in FIG. 1B.

When the position directional relation and the condition of mobile communications have changed from the state shown in FIG. 1A to the state shown in FIG. 1B, a signal in which frequency shift to higher direction is occurring among the down link signals received at the mobile station 104 is only the downlink signal Sda which is being transmitted from the base station 103. As a result, the downlink signal which the mobile station 104 selects and demodulates is switched from the downlink signal Sdd transmitted by the base station 102 to the downlink signal Sda transmitted by the base station 103 when a situation has moved into a situation of FIG. 1B from a situation of FIG. 1A.

Next, an operation of the mobile station 104 which transmits an uplink signal toward a base station will be described in a situation of FIG. 1B.

When the uplink signal is transmitted, the mobile station 104 discriminates the base station which locates behind the moving course of own mobile station and relatively moving away, and transmits the uplink signal toward the base station. The mobile station 104 discriminates the base station to which the uplink signal is to be transmitted by the following procedures.

In a situation of FIG. 1B, the downlink signal of frequency fo is transmitted to the mobile station 104 from the base station 103 which approaches the mobile station 104, and at the same time, the downlink signals, which are not shown, of frequency fo (identical with the transmitting frequency of the base station 103) are also transmitted to the mobile station 104 from the base stations 101 and 102 which are moving away from the mobile station 104. When the mobile station 104 receives these downlink signals from the base stations 101 and 102, the mobile station 104 recognizes that the frequency shift to lower direction by Doppler effect is occurring in each frequency of these downlink signals. The mobile station 104 recognizes that the base stations 101 and 102 are moving away from own mobile station based on this recognition. And the mobile station 104 designates the base station which transmits a better receiving quality downlink signal from among a plurality of base stations 101 and 102 as the base station to which the uplink signal is to be transmitted.

The mobile station 104 may select a plurality of uplink signal reception base stations 101 and 102 at the time of the soft handover. The mobile station 104 may designate the uplink signal reception base station by the following method. For example, by comparing the strength of the reception signal level of each of the downlink signals (in which frequency shift to lower direction by Doppler effect is occurring), the mobile station 104 estimates the nearest base station or the base station having less radio interferences. And the mobile station 104 may designate the estimated base station, as the nearest base station or the base station having less radio interferences, as the base station to which the uplink signal is to be transmitted. In this case, in a situation of FIG. 1B (apart from the case where there exists disabilities caused by buildings and geography), the mobile station 104 designates the nearest base station as the base station to which the uplink signal is to be transmitted. And the mobile station 104 transmits the uplink signal Sud to the base station 102. The base station 102 designated by the mobile station 104 receives the uplink signal Sud from the mobile station 104.

The mobile station 104 may discriminate the uplink signal reception base station using a method of other than above. For example, the mobile station 104 may discriminate the base station to which, the uplink signal is to be transmitted by comparing a rate of error detection. Or, the mobile station 104 may hold positional relationship information with a plurality of surrounding base stations in advance in the memory circuit 229 via a network and discriminates the base station to which the uplink signal is to be transmitted based on the given positional relationship information with base stations and frequency shift to lower direction by Doppler effect in a receiving signal.

Next, an operation of the mobile station will be described in detail.

FIG. 2 is a block diagram showing the electrical configuration of the mobile station 104 shown in FIG. 1 in detail. Different configuration of the mobile station 104 according to this embodiment from a conventional configuration shown in FIG. 11 is that it is provided with a delay/frequency mapper 208. At the time of mobile communications, the delay/frequency mapper 208 judges and selects the base station whose downlink signal is suitable to receive from among the base stations which locate ahead of the moving course, and also judges and designates the base station to which it is suitable to transmit the uplink signal from among the base stations which locate behind the moving course.

An operation of each part of the mobile station 104 will be described with reference to FIG. 2. In the mobile station 104 shown in FIG. 2, the reference clock generator (TCXO) 203 generates a reference clock, outputs it to the PLL 217 of the receiving circuit side and the PLL 227 of the transmitting circuit side, and also supplies the clock to the timing generator 207. The PLL 217 of the receiving circuit side generates a local frequency signal to be input to the quadrature demodulator (DEM) 213 using output of the reference clock generator 203 as a reference clock. The PLL 227 of the transmitting circuit side generates a local frequency signal to be input to the quadrature modulator (MOD) 223 using output of the reference clock generator 203 as a reference clock.

First, a receiving operation of the mobile station 104 will be described.

Each of the downlink signals (receiving signals) transmitted from the base stations 101, 102 and 103 is received at the antenna (duplex antenna) 201 and led by the duplexer (DUP) 202 to the receiving circuit. The downlink signal led to the receiving circuit is amplified in the low noise amplifier (LNA) 211, and only a high-frequency signal in a required bandwidth is selected by the band-pass filter (BPF) 212, and then it is input to the quadrature demodulator (DEM) 213. The quasi-synchronous demodulation is performed for the high-frequency signal input to the quadrature demodulator (DEM) 213 by a local frequency signal supplied from the PLL 217, and it is further converted into a reception analog baseband signal. The converted reception analog baseband signal is further converted into a reception digital baseband (a reception DBB) signal in the A/D converter 216. The converted reception digital baseband signal is input to the delay profile searcher 206 and the finger circuit 218. Here, a reference clock from a signal source base station is being superposed on each of the reception digital baseband signals input sequentially. When the mobile station 104 is moving at high-speed to the base station, frequency shift due to Doppler effect is occurring in this reference clock.

The delay profile searcher 206 compares a frame timing signal given from the timing generator 207 and the input reception digital baseband signal, generates a frame timing correction time and outputs to the delay/frequency mapper 208.

Here, the frame timing correction time output from the delay profile searcher 206, includes the base station information such as a scramble code which is a specific base station identification code and assigned for each received base station.

The delay/frequency mapper 208 compares the base station information (a scramble code) which is included in the input frame timing correction time and the frequency offset value for each (received) base station input from the frequency offset estimator 205. As a result, the delay/frequency mapper 208 discriminates the scramble code used by the transmission base station of the downlink signal, and judges whether the base station using the scramble code locates ahead of the moving course of the own mobile station or behind the moving course. Based on this judgment, the delay/frequency mapper 208 decides which reception digital baseband signal from which base station is suitable to receive and demodulate, from reception digital baseband signals indicated by the frame timing correction times sequentially input from the delay profile searcher 206. Based on this decision, the delay/frequency mapper 208 outputs the frame timing correction time, which selects the reception digital baseband signal from the base station which has been treated as "suitable to receive and demodulate", to the timing generator 207.

The delay/frequency mapper 208 also judges, to which base station is suitable for transmitting the uplink signal. As a result of this judgment, the delay/frequency mapper 208 generates a scramble code selection signal, indicating a scramble code which can be recognized only by the base station (the uplink signal reception base station) judged as "suitable for receiving an uplink signal", and a channelization code selection signal, and supplies these to the channel codec 228.

The timing generator 207 generates an ideal frame timing signal based on a reference clock supplied from the reference clock generator 203. And the timing generator 207 generates a frame timing signal by adding the "selected" frame timing correction time supplied from the delay/frequency mapper 208 to the generated ideal frame timing signal, and supplies the frame timing signal to the finger circuit 218 and the delay profile searcher 206.

The finger circuit 218 includes a plurality of fingers for separating receiving signals in multipath components. The finger circuit 218 demodulates the reception digital baseband signal based on a (corrected) frame timing signal supplied from the timing generator 207, sends the output from each finger to the RAKE circuit 219 and outputs pilot data which is the output from each finger to the frequency offset estimator 205.

The frequency offset estimator 205 calculates the frequency offset value of each finger, based on the pilot data (a reference signal from a base station which is superposed on the reception digital baseband signal) which is the output from each finger configuring the finger circuit 218, and outputs the frequency offset value of each finger to the RAKE circuit 219. The frequency offset estimator 205 calculates the frequency offset value for each received base station, and outputs this to the delay/frequency mapper 208. Further, the frequency offset estimators 205 performs weighted synthesis of the frequency offset value of each finger in the finger circuit 218. The frequency offset estimator 205 outputs the synthetic frequency offset value, in which the weighted synthesis has been completed, to the accumulator 204.

The RAKE circuit 219 generates receiving data in which the fading effect has been reduced by performing the weighted synthesis of the output data from each finger in the finger circuit 218 based on the frequency offset value of each finger calculated in the frequency offset estimator 205.

The accumulator 204 adds the synthetic frequency offset value, in which the weighted synthesis has been completed and supplied from the frequency offset estimator 205, to the present output value. The accumulator 204 outputs this addition result to a frequency control terminal of the reference clock generator 203.

The reference clock generator 203 generates a reference clock by changing oscillation frequency according to the output value of the accumulator 204 input to the frequency control terminal. The reference clock generator 203 outputs the generated reference clock to the PLL 217 on the receiving circuit side and the PLL 227 on the transmitting circuit side, and also supplies to the timing generator 207 as mentioned above. In this way, the output frequency (the reference clock frequency) of the reference clock generator 203 follows the reference clock frequency from the base station which is superposed on the reception digital baseband signal and changes.

Next, a transmission operation of the mobile station 104 will be described.

The channel codec 228 generates a transmission digital baseband signal (a transmission DBB signal) by encoding input transmitting data by the codes designated by the scramble code selection signal and the channel code selection signal (signals which indicate codes which can be recognized only by the base station which has been judged as "suitable for the transmitting destination" by the delay/frequency mapper 208) input from the delay/frequency mapper 208.

The transmission digital baseband signal is converted by the D/A converter 226 into a transmission analog baseband signal. The transmission analog baseband signal is further converted into a transmission high-frequency signal in the quadrature modulator (MOD) 223 using a local frequency signal supplied from the PLL 227. The transmission high-frequency signal is filtered on predetermined transmission bandwidth and amplified by the AGC amplifier 224, the band-pass filter (BPF) 222 and the power amplifier (PA) 221. After that, the transmission high-frequency signal is led to the antenna 201 in the duplexer (DUP) 202, and is transmitted from the antenna 201 as the transmitting signal (the uplink signal).

The mobile station 104 performs the receiving operation and the transmission operation like the above.

Next, an operation of the mobile radio communication system of this example will be described with reference to FIG. 1.

The communication state, in which the mobile station 104 locating between the base station 101 and the base station 102 is moving away from the base station 101 and moving toward the base station 102 as shown in FIG. 1A, will be described.

At this time, the delay/frequency mapper 208 of the mobile station 104 receives base station information (a scramble code) included in a frame timing correction time from the delay profile searcher 206. The delay/frequency mapper 208 also receives the frequency offset value for each (received) base station from the frequency offset estimator 205. And the delay/frequency mapper 208 recognizes that the base station 102 and the base station 103 are locating ahead of the moving course of the mobile station 104 based on the base station information (the scramble code) and the frequency offset value. At the same time, the delay/frequency mapper 208 recognizes that the base station 101 is locating behind the moving course of the mobile station 104 (recognition of change in relative positions).

The mobile station 104 discriminates the downlink signals Sdd and Sda from the base stations 102 and 103 which are locating ahead of the moving course of the mobile station 104 by the scramble code at the time of reception and demodulation. This can be realized by each function of the frequency offset estimator 205, the accumulator 204, the reference clock generator 203, the delay profile searcher 206, the delay/frequency mapper 208, the timing generator 207, the finger circuit 218 and the RAKE circuit 219 or the like. Also, the mobile station 104 sequentially selects and demodulates one of the discriminated downlink signals Sdd and Sda, for example, the downlink signal having higher receiving intensity by performing the soft handover when needed.

As a result, the mobile station 104 selects and demodulates only the downlink signal from the base station 102 or the downlink signal from the base station 103 locating ahead of the moving course. And the mobile station 104 makes a frequency of the reference clock follow a frequency of the downlink signal (a reception high-frequency signal) from the base stations 102 and 103 by each of functions of the frequency offset estimator 205, the accumulator 204, the reference clock generator 203 and the PLL 217. For this reason, the frequency shift to higher direction by the influence of Doppler effect is occurring to the reference clock. That is, a frequency of the reference clock becomes the value represented by the formula (2) (here, v is a moving speed of the mobile station 104 and c is light speed).

On the other hand, when transmitting, the mobile station 104 generates the uplink signal Sub which is encoded by the scramble code which can be discriminated only by the base station 101 locating behind the moving course of the mobile station 104, and transmits the uplink signal Sub by each of functions of the delay/frequency mapper 208 and the channel codec 228 or the like. Transmission timing and a frequency of the uplink signal (a transmission high-frequency signal) are generated by each of functions of the frequency offset estimator 205, the accumulator 204, the reference clock generator 203 and the PLL 227 based on a reference clock which follows a frequency of the reception high-frequency signal (the downlink signal). Therefore, the frequency shift to higher direction is occurring in a frequency of the uplink signal like a reference clock. That is, a frequency of the uplink signal becomes the value represented by the formula (2). The uplink signal Sub transmitted from the mobile station 104 is received only by the base station 101 because of encoding by the scramble code.

The base station 101 locates behind the moving course of the mobile station 104. For this reason, frequency shift to lower direction is occurring in a frequency of the signal received by the base station 101, that is, the uplink signal Sub transmitted from the mobile station 104. Specifically, a frequency of the uplink signal Sub becomes the value that is expressed in the formula (2) in which (−v) is substituted for v.

As a result, a frequency observed at the base station 101 becomes as below.

$$f = \frac{\sqrt{1+(v/c)}}{\sqrt{1-(v/c)}} \cdot \frac{\sqrt{1-(v/c)}}{\sqrt{1+(v/c)}} \cdot f_0 = f_0 \quad (9)$$

That is, the frequency shift by Doppler effect occurring in the downlink signals Sdd, Sda and the uplink signals Sub respectively is canceled each other. The base station 101 receives the uplink signal Sub in which the frequency shift has been canceled in this way.

Next, an operation of the case where the mobile station 104 has passed the base station 102 and is moving between the base station 102 and the base station 103 as shown in FIG. 1B, will be described. At that time, the delay/frequency mapper 208 recognizes that the base station 103 is locating ahead of the moving course of the mobile station 104 based on the base station information (the scramble code) and the frequency offset value for each (received) base station. At the same time, the delay/frequency mapper 208 recognizes that the base station 101 and the base station 102 are locating behind the moving course of the mobile station 104. In other words, the mobile station 104 recognizes that the base station 102 has moved its location from ahead of the moving course of own mobile station to behind the moving course. Here, the base station information (the scramble code) is included in a frame timing correction time supplied from the delay profile searcher 206. Also, the frequency offset value for each base station is input from the frequency offset estimator 205.

Based on this recognition, the mobile station 104 discriminates the downlink signal Sda from the base station 103 which locates ahead of the moving course of own mobile station based on the scramble code at the time of reception and demodulation. This can be realized by each function of the frequency offset estimator 205, the accumulator 204, the reference clock generator 203, the delay profile searcher 206, the delay/frequency mapper 208, the timing generator 207, the finger circuit 218 and the RAKE circuit 219 or the like. And, the mobile station 104 performs the soft handover for the downlink signal transmission base station from the base station 102 to the base station 103. And, the mobile station 104 selects only the downlink signal Sda from the base station 103 and demodulates that.

On the other hand, when transmitting, the mobile station 104 generates the uplink signals Sub and Sud which are encoded by each scramble code which can be discriminated by the base station 101 or 102 locating behind the moving course of own mobile station, and transmits these by each of functions of the delay/frequency mapper 208 and the channel codec 228 or the like. The uplink signal Sub transmitted from the mobile station 104 is received only by the base station 101 by its encoded scramble code. On the other hand, the uplink signal Sud transmitted from the mobile station 104 is received only by the base station 102 by its encoded scramble code.

The base stations 101 and 102 locate behind the moving course of the mobile station 104. For this reason, in the base stations 101 and 102, frequency shift to lower direction influenced by Doppler effect is occurring in each frequency of the uplink signals Sub and Sud respectively transmitted from the mobile station 104. Specifically, the uplink signals Sub and Sud are observed in the base stations 101 and 102 as a signal of a frequency expressed by the formula (2) in which (−v) is substituted for v. As a result, the base stations 101 and 102 receive the uplink signal Sub and Sud in which the frequency shift by Doppler effect occurring respectively in the downlink signal Sda and the uplink signals Sub and Sud has been canceled. Further, by aforementioned constitution, in the WCDMA communication system, a main uplink signal reception base station can be changed from the base station 101 to the base station 102 which is nearer to the mobile station 104 by the soft handover when the mobile communication condition has shifted from the state of FIG. 1A to the state of FIG. 1B. Further, the base station 103 recognizes that these uplink signals Sub and Sud are not for own base station based on the scramble code.

According to this embodiment 1 like the above, the base station receives the uplink signal in which the frequency shift by Doppler effect has been canceled because the mobile station receives the downlink signal from the base station locating ahead of the moving course and transmits the uplink signal to the base station locating behind the moving course. By this configuration, the effect, in which good communication can be realized without causing increase in the amount of operation for a frequency correction process and increase in the amount of power consumption and heat emission produced, by that, is obtained because the base station does not need to perform processing to correct any change in frequency. The effect, in which throughput of the signal processing does not degrade, is also obtained because the above-mentioned correction process becomes unnecessary.

Here, when the same base station is used for transmission and reception of the uplink signal and the downlink signal as generally performed by a mobile station, frequency shift suddenly changes from higher direction to lower direction by Doppler effect when the mobile station passes the base station. If the offset estimated function can not follow this sudden change of frequency shift, there is a problem that increases the signal error rate and causes degradation of signal quality.

In contrast, in the present invention, the effect that can prevent degradation of signal quality caused by reversing of a polarity of frequency shift by Doppler effect is obtained, because the mobile station always selects a signal whose frequency has shifted only to higher direction or only to lower direction by Doppler effect as the downlink signal.

Embodiment 2

FIG. 3A and FIG. 3B are drawings which explain the whole arrangement configuration of a WCDMA communication system according to the second embodiment of the present invention and the condition of the mobile communication. According to this embodiment 2, as shown in FIG. 3A and FIG. 3B, it is supposed that each of the base stations 301, 302 and 303 is arranged in spaced side-by-side relation to each other on one-dimensional space by this order from the left side in the figure for descriptive reasons. FIG. 3A shows a condition of the mobile communication before the mobile station 304 passes the base station 302 that exists in the route way while moving toward the right side in the figure. FIG. 3B shows a condition of the mobile communication after the mobile station 304 has passed the base station 302.

According to this second embodiment, different transmission and reception frequencies are used in the base stations 301, 302 and 303 each other. The mobile station 304 recognizes a position direction of the base stations 301, 302 and 303 by detecting frequency shift by Doppler effect. Based on this recognition, by selecting and designating a frequency, the mobile station 304 selects a downlink signal transmission base station which is suitable for transmitting a downlink signal to the mobile station 304 and an uplink signal reception base station which is suitable for receiving an uplink signal from the mobile station 304.

First, the condition of the mobile communications in the position directional relation shown in FIG. 3A will be described.

In this mobile communication condition, the mobile station 304 is moving between the base station 301 and the base station 302 to the right side in the figure at speed v [m/s]. The mobile station 304 recognizes that it moves away from the base station 301 and is approaching the base station 302 and the base station 303 by detecting frequency shift by Doppler effect.

First, an operation of the mobile station 304 to receive a downlink signal will be described.

The mobile station 304 receives the downlink signal Fdd of frequency F2 transmitted from the base station 302 and the downlink signal Fda of frequency F3 transmitted from the base station 303 by changing the local (LO) frequency setting of the PLL 217. Although it is not shown, the mobile station 304 also receives the downlink signal of frequency F1 transmitted from the base station 301. In the situation of FIG. 3A, the mobile station 304 selects the downlink signal of the base station locating ahead of the moving course from among the received downlink signals, and demodulates this. When a plurality of base stations are locating ahead of the moving course, the mobile station 304 selects, for example, the downlink signal with the highest receiving intensity, here, the downlink signal Fdd of frequency F2 transmitted from the nearest base station 302, and demodulates this.

On the other hand, when transmitting an uplink signal, the mobile station 304 generates the uplink signal Fub of frequency F4 which can be received only by the base station 301 which is moving away, and transmits that. The uplink signal Fub of frequency F4 transmitted from the mobile station 304 is received only by the base station 301.

Next, as shown in FIG. 3B, an operation of the mobile station 304, when the mobile station 304 has passed the base station 302, will be described.

First, an operation of the mobile station 304 to receive a downlink signal will be described.

The mobile station 304 recognizes that own mobile station is moving away from the base stations 301 and 302 and approaching the base station 303 by detecting frequency shift of the receiving signal by Doppler effect. The mobile station 304 switches the base station, which has been selected as the downlink signal transmission base station, to the base station 303 from the base station 302. And the mobile station 304 selects the downlink signal Fda of frequency F3 transmitted from the base station 303 which only locates ahead of the moving course from among received downlink signals, and demodulates this.

On the other hand, when transmitting, the mobile station 304 generates the uplink signals Fub and Fud of frequency F4 and F5 which can be received by the base stations 301 and 302 locating behind the moving course of own base station, and transmits those. The uplink signal Fub of frequency F4 transmitted from the mobile station 304 is received only by the base station 301. The uplink signal Fud of frequency F5 transmitted from the mobile station 304 is received only by the base station 302. By aforementioned constitution, in the WCDMA communication system, a main uplink signal reception base station can be switched from the base station 301 to the base station 302 which is nearer to the mobile station 304.

Figure 3:
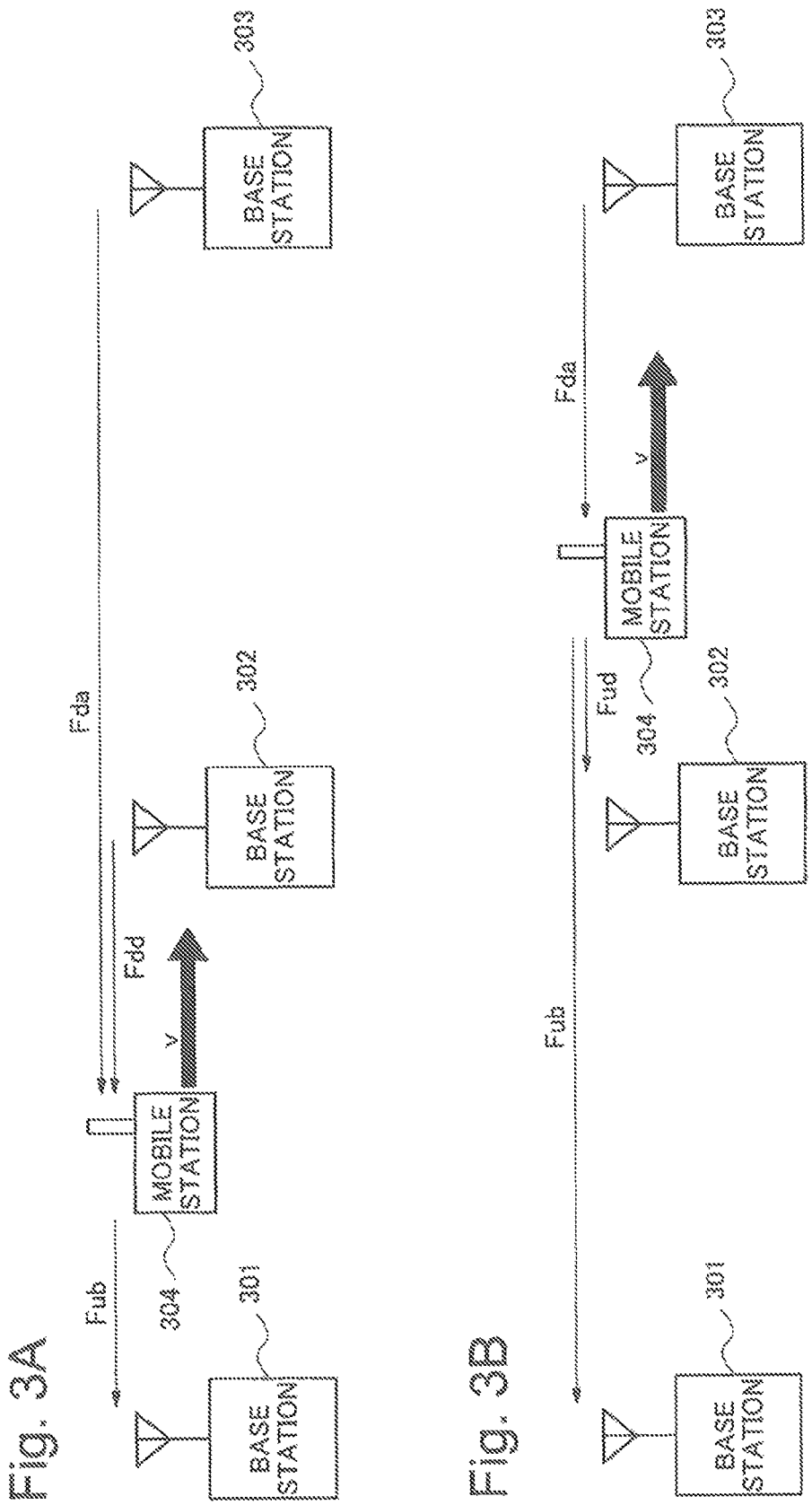
FIG. 3A and FIG. 3B are figures illustrating the whole arrangement configuration of a WCDMA communication system which is the second embodiment of the present invention and conditions of mobile communications.
Figure 4:
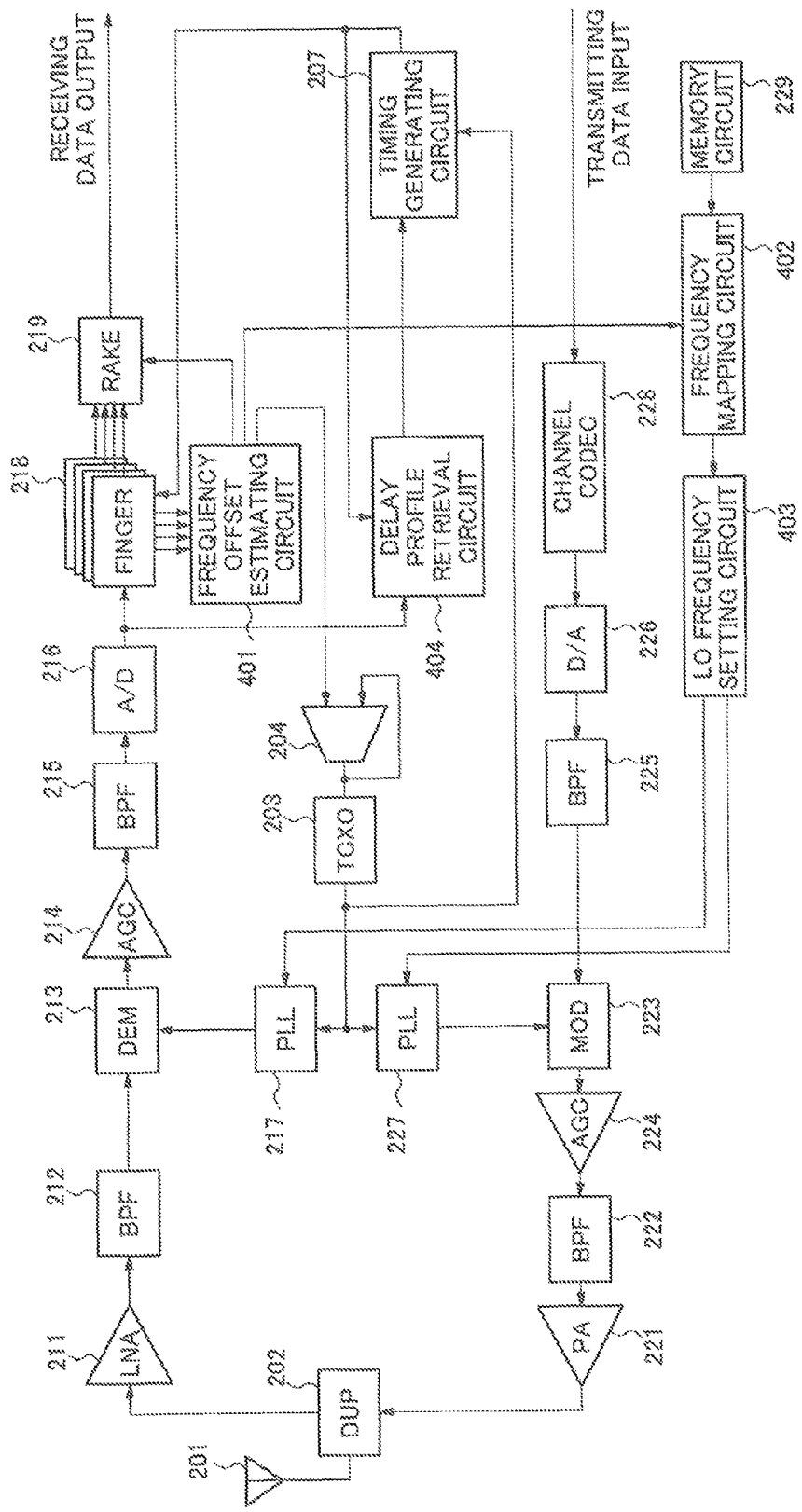
FIG. 4 is a block diagram showing the electrical configuration of the mobile station according to the second embodiment of the present invention in detail.

FIG. 4 is a block diagram showing in detail the electrical configuration of the mobile station 304 shown in FIG. 3. An operation of the mobile station 304 according to this embodiment 2 will be described with reference to FIG. 4.

The delay profile searcher 404 generates a frame timing correction time by comparing a frame timing signal given from the timing generator 207 and the input reception digital baseband signal, and outputs that to the timing generator 207.

The frequency offset estimator 401 calculates the frequency offset value of each finger based on the pilot data (a reference signal from the base station which is superposed on the reception digital baseband signal) which is output from each finger composing the finger circuit 218, and outputs the frequency offset value of each finger to the RAKE circuit 219.

The frequency offset estimator 401 calculates the frequency offset value for each received base station and, outputs that to the frequency mapper 402.

The frequency mapper 402 generates a local (LO) frequency information signal based on the input frequency offset value for each base station, and outputs that to the local frequency setting circuit 403. The local frequency setting circuit 403 generates a local frequency setting signal for reception based on the input local frequency information signal. The local frequency setting circuit 403 performs a receiving frequency setting operation for the PLL 217 by outputting the generated local frequency setting signal for reception to the PLL 217 on the receiving circuit side. The local frequency setting circuit 403 also generates the local frequency setting signal for transmission. The local frequency setting circuit 403 performs a transmitting frequency setting operation for the PLL 227 by outputting the generated local frequency setting signal for transmission to the PLL 227 on the transmitting circuit side.

The local frequency setting circuit 403 successively sets the receiving frequency of the PLL 217 to a frequency which is possibly used by the base station. This will enable the mobile station 304 to receive downlink signals from the base stations 301, 302 and 303 which exist in neighboring around. As a result, the frequency mapper 402 can recognize the position directions (relative position change) of the base stations 301, 302 and 303 by considering each frequency used by the base stations 301, 302 and 303 and frequency shift by Doppler effect. Further, in FIG. 4, the identical code is attached and the description is omitted for a component which is identical, with a component of FIG. 2.

As above, according to this embodiment 2, the mobile station receives a downlink signal from the base station which is locating ahead of the moving course among a plurality of base stations which use different transmitting and receiving frequencies each other by switching the setting for local frequencies. The mobile station also generates an uplink signal of a frequency which can be received by the base station locating behind the moving course, and transmits that to the base station. By this configuration, because the base station receives the uplink signal in which the frequency shift by Doppler effect has been canceled, the base station does not need to perform processing to correct any change in frequency. Accordingly, the effect, in which good communication can be realized without causing increase in the amount of operation for a correction process and increase in the amount of power consumption and heat emission produced by that, is obtained. The effect, in which throughput of the signal processing does not degrade, is also obtained because the above-mentioned correction process becomes unnecessary.

As stated in the above-mentioned embodiment 1, the effect that can prevent degradation of signal quality caused by reversing of a polarity of frequency shift by Doppler effect is obtained, because the mobile station always selects a signal whose frequency has shifted only to higher direction or only to lower direction by Doppler effect as the downlink signal.

Embodiment 3

Figure 6:
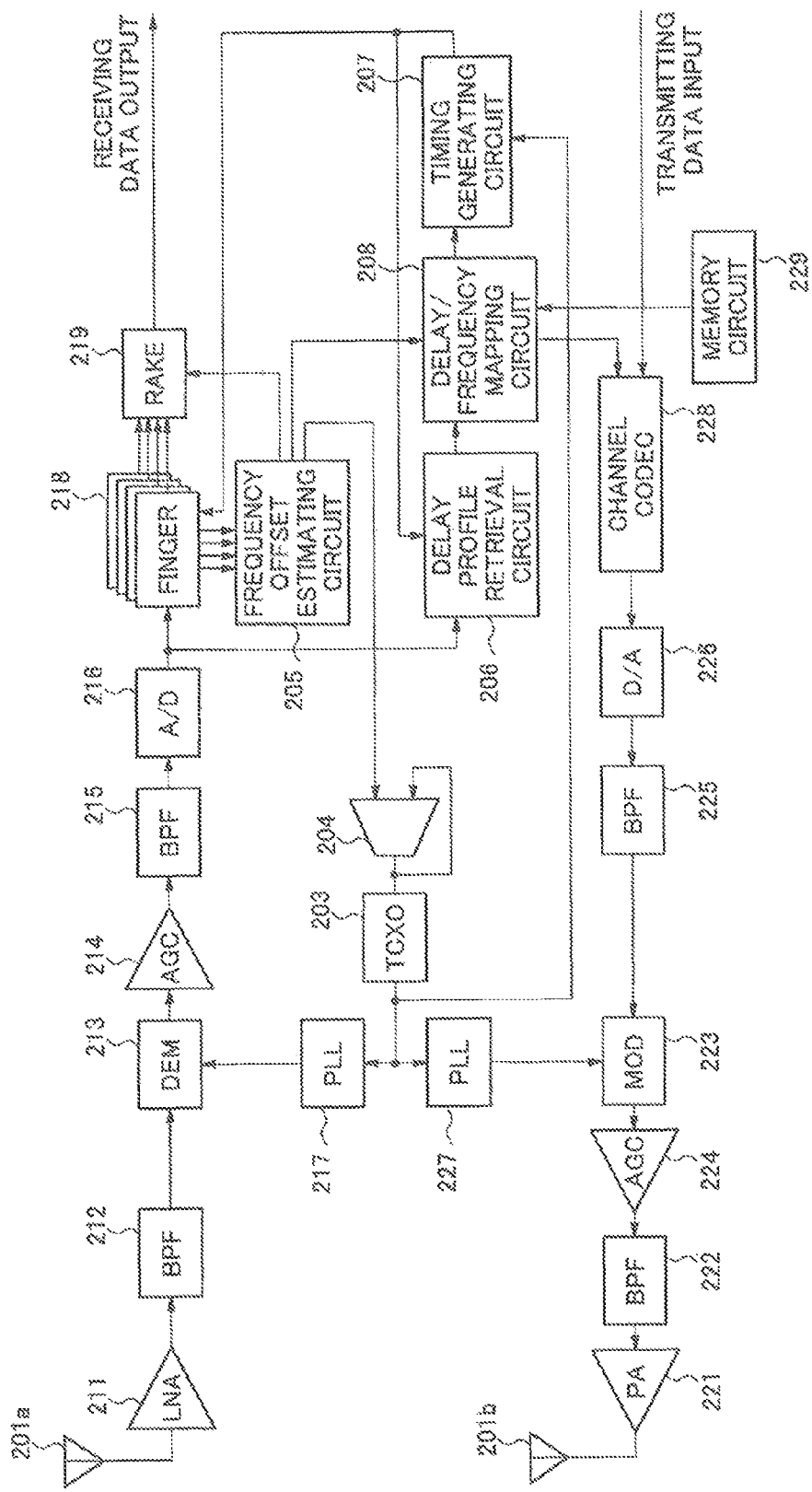
FIG. 6 is a block diagram showing the electrical configuration of the mobile station according to the third embodiment of the present invention in detail.

FIG. 5A and FIG. 5B are figures for explaining the whole arrangement configuration of a WCDMA communication system which is the third embodiment of the present invention and the condition of mobile communications. FIG. 6 is a block diagram illustrating the electrical configuration of the mobile station 504 shown in FIG. 5 in detail. According to this embodiment 3, as shown in FIG. 5A and FIG. 5B, each of the base stations 501, 502 and 503 is arranged in spaced side-by-side relation to each other on one-dimensional space by this order from the left side in the figure for descriptive reasons. FIG. 5A shows a condition of mobile communications before the mobile station 504 (for example, an on-vehicle mobile station) passes the base station 502 that exists in the route way while moving toward the right side in the figure. FIG. 5B shows a condition of mobile communications after the mobile station 504 has passed the base station 502.

According to this embodiment 3, the mobile station 504 has two antennas having directivity of the opposite direction each other instead of a single non-directional antenna (duplex antenna) 201. That is, the mobile station 504 includes the antenna 201*a* having the directivity which is facing in front of the moving course and the antenna 201*b* having the directivity which is facing behind the moving course. In accordance with this provision, as shown in FIG. 6, this mobile station 504 is not equipped with DUP 202 shown in FIG. 2. Further, according to this embodiment 3, the base stations 501, 502 and 503 are using an identical transmitting and receiving frequency together.

First, the condition of the mobile communications by the position directional relation shown in FIG. 5A will be described. In this mobile communication condition, the mobile station 504 is moving between the base station 501 and the base station 502 to the right side in the figure. Here, the mobile station 504 holds positional relationship information on the (neighboring around) base stations 501, 502 and 503 in advance via a network. The mobile station 504 recognizes that the base station 502 and the base station 503 are locating ahead of the moving course based on the receiving downlink signals Hdd and Hda which are being transmitted from the base stations 502 and 503 locating ahead of the moving course via the front directional antenna 201*a*. The mobile station 504 recognizes that the base station 501 is locating behind the moving course based on a fact that the downlink signal from the base station 501 cannot be received. Based on this recognition, the mobile station 504 selects only the downlink signals Hdd and Hda received from the base stations 502 and 503 locating ahead of the moving course, and demodulates those. The mobile station 504 transmits the uplink signal Hub to only the base station 501 locating behind the moving course via the rear directional antenna 201*b*.

Next, as shown in FIG. 5B, the mobile communication condition when the mobile station 504 has passed the base station 502, will be described. The mobile station 504 recognizes that the base station 503 is locating ahead of the moving course based on the receiving downlink signal Hda which is being transmitted from the base station 503 locating ahead of the moving course via the front directional antenna 201*a*. The mobile station 504 recognizes that the location of the base station 502 has changed from ahead of the moving course to a backward direction of the moving course based on a fact that the downlink signals from the base stations 501 and 502 cannot be received. Based on this, the mobile station 504 selects only the downlink signal Hda received from the base stations 503 locating ahead of the moving course, and demodulates this. The mobile station 504 transmits'the uplink signals Hud and Hub to only the base stations 501 and 502 locating behind the moving course via the rear directional antenna 201*b*.

As stated above, according to this embodiment 3, the mobile station 504 recognizes that each base station is locating ahead of the moving course or behind the moving course based on the downlink signal received by the front directional antenna 201*a* and the rear directional antenna 201*b*. And the to mobile station 504 selects only the downlink signal being transmitted from the base station locating ahead of the moving course via the front directional antenna 201*a*, and demodulates that. The mobile station 504 transmits the uplink signal to the base station locating behind the moving course via the rear directional antenna 201b. By this configuration, because the base station receives the uplink signal in which the frequency shift by Doppler effect has been canceled, the base station does not need to perform processing to correct any change in frequency. Accordingly, the effect, in which good communication can be realized without causing increase in the amount of operation for a correction process and increase in the amount of power consumption and heat emission produced by that, is obtained. The effect, in which throughput of the signal processing does not degrade, is also obtained because the above-mentioned correction process becomes unnecessary.

As stated in the above-mentioned embodiment 1, the effect that can prevent degradation of signal quality caused by reversing of a polarity of frequency shift by Doppler effect is obtained, because the mobile station always selects only a signal whose frequency has shifted only to higher direction or only to lower direction by Doppler effect as the downlink signal.

Embodiment 4

Figure 7:
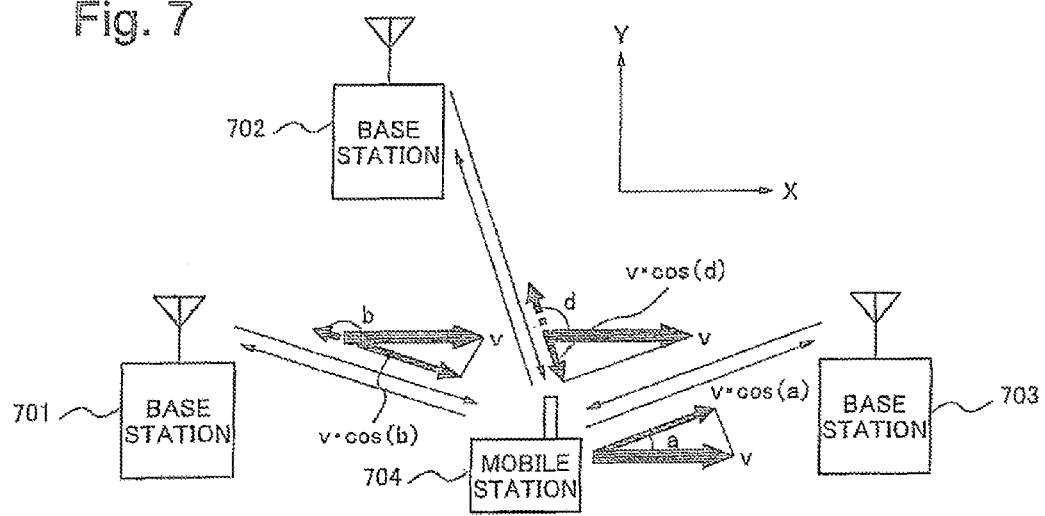
FIG. 7 is a figure illustrating the whole arrangement configuration of a WCDMA communication system which is the fourth embodiment of the present invention and conditions of mobile communications.

FIG. 7 is a figure for explaining the whole arrangement configuration of a WCDMA communication system which is the fourth embodiment of the present invention and the condition of the mobile communications.

In the first, second and third above-mentioned embodiments, it has been described about a case where a plurality of base stations are arranged in spaced side-by-side relation to each other on one-dimensional. However, in this fourth embodiment, as shown in FIG. 7, it will be described about a case where a plurality of base stations 701, 702 and 703 are arranged on two-dimensional space.

In this two-dimensional arrangement configuration, the relative speed of the mobile station 704 to each of the base stations 701, 702 and 703 is obtained based on an inner product of the velocity vector of the mobile station 704 and the unit vector headed from the mobile station 704 to each of the base stations 701, 702 and 703. In other words, supposing the mobile station 704 is moving to the right side (the X axial direction) in the figure at speed v [m/s], the relative speed V1 of the mobile station 704 to the base station 701 is V1=v·cos (b). The relative speed V2 of the mobile station 704 to the base station 702 is V2=v·cos(d). The relative speed V3 of the mobile station 704 to the base station 703 is V3=v·cos(a). Here, b is the angle between the velocity vector of the mobile station 704 and the unit vector headed from the mobile station 704 to the base station 701. d is the angle between the same velocity vector and the unit vector headed from the mobile station 704 to the base station 702. Also, a is the angle between the same velocity vector and the unit vector headed from the mobile station 704 to the base station 703.

Figure 8:
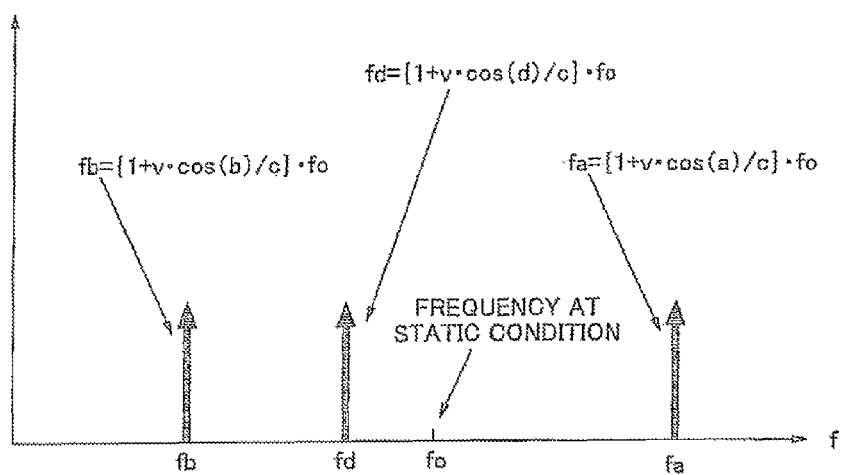
FIG. 8 is a figure showing a shift in the downlink signal frequency, observed at a mobile station, caused by Doppler effect occurring under the conditions of mobile communications shown in FIG. 7.

FIG. 8 is a graph showing the frequency shift caused by Doppler effect occurring to each of the downlink signals observed at the mobile station under the mobile communication condition of FIG. 7. Under the mobile communication condition of FIG. 7, as shown in FIG. 8, frequency fo of the downlink signal from the base station 701 is received as follows at the mobile station 704.

$$fb = \{1+v\cdot\cos(b)/c\}fo \quad (10)$$

Similarly, fo of the downlink signal from the base station 702 is received as follows at the mobile station 704.

$$fd = \{1+v\cdot\cos(d)/c\}fo \quad (11)$$

Further, frequency fo of the downlink signal from the base station 703 is received as follows at the mobile station 704.

$$fa = \{1+v\cdot\cos(a)/c\}fo \quad (12)$$

Here, c is light speed. fo is the downlink signal transmitting frequency from the base stations 701, 702 and 703 and is also the downlink signal receiving frequency from the base stations 701, 702 and 703 received by the mobile station 704 in a static condition. The influence of Doppler effect is indicated using an approximation formula here. That is, when the formula (3) is applied to the formula (1) at v<<c, the following approximation formula is obtained.

$$f \approx \frac{1}{1-(v/c)\cos\theta} f_0 \quad (13)$$

When v<<c, the formula (13) further becomes as follows.

$$f \approx \frac{1}{1-(v/c)\cos\theta} f_o \approx [1+(v/c)\cos\theta]f_o \quad (14)$$

Then, the above formulas (10), (11) and (12) explain frequency shift by the influence of Doppler effect using the formula (14).

As it is clear from FIG. 8, with respect to the downlink signal transmitting frequency fo, the absolute value of a frequency difference amount of the downlink signal receiving frequency fb from the base station 701 approximates to the absolute value of a frequency difference amount of the downlink signal receiving frequency fa from the base station 703, and their changes are reversed each other. Also, in the WCDMA communication system of this embodiment 4, the configuration is supposed that the mobile station 704 selects the base station 703, which is relatively approaching, as the downlink signal transmission base station and designates the base station 701, which is relatively moving away, as the uplink signal reception base station. As a result, in communication between the base station 701 and the mobile station 704, and in communication between the base station 703 and the mobile station 704, the influence of Doppler effect, which occurs in each communication, functions in direction to cancel each other. Accordingly, in the WCDMA communication system of this embodiment 4, it can be said that the influence of Doppler effect can be reduced sufficiently.

Further, according to this embodiment 4, the influence of Doppler effect remains depending on the angle between the velocity vector of the mobile station 704 and the unit vector headed from the mobile station 704 to the base station 701, 702 or 703. However, the influence of Doppler effect which remains here is 0.01 ppm (parts per million), in other words the value of order of one the eighth power of 10. Because this value is a very small value with respect to a frequency which is received by the base station, it may be regarded as an acceptable range.

Even if it is a case of configuration that the mobile station 704 selects the base station 701 which is relatively moving away as the downlink signal transmission base station and designates the base station 703 which is relatively approaching as the uplink signal reception base station, the influence of Doppler effect occurring in each communication between the base stations 701 and 703 and the mobile station 704 can be reduced sufficiently in the acceptable range similar to the configuration as described above.

As stated above, according to this embodiment 4, the mobile station 704 also selects the base station which is relatively approaching own mobile station as the downlink signal transmission base station, and selects the base station which is relatively moving away as the uplink signal transmission base station based on a relative speed of the mobile station 704 to each of the base stations 701, 702 and 703 in the WCDMA communication system of the configuration in which a plurality of base stations are arranged on the two-dimensions. By this configuration, the base station does not need to perform processing to correct the frequency shift by Doppler effect because the frequency shift can be sufficiently reduced in an acceptable range. Accordingly, the effect, in which good communication can be realized without causing increase in the amount of operation for a correction process and increase in the amount of power consumption and heat emission produced by that, is obtained. The effect, in which throughput of the signal processing does not degrade, is also obtained because the above-mentioned correction process becomes unnecessary.

As stated in the above-mentioned embodiment 1, the effect that can prevent degradation of signal quality caused by reversing of a polarity of frequency shift by Doppler effect is obtained, because the mobile station always selects a signal whose frequency has shifted only to higher direction or only to lower direction by Doppler effect as the downlink signal.

Embodiment 5

Figure 9:
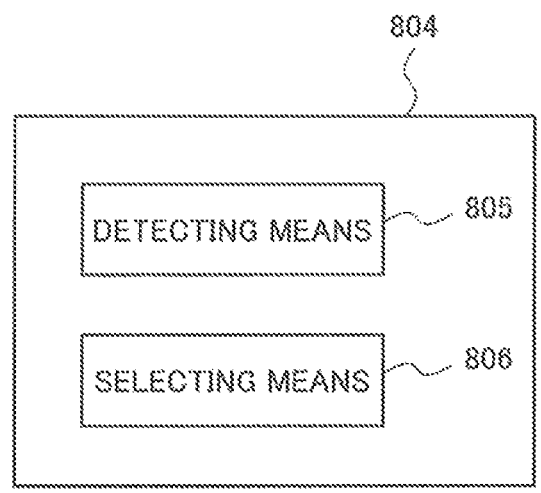
FIG. 9 is a block diagram showing the electrical configuration of the mobile station according to the fifth embodiment of the present invention in detail.
Figure 10:
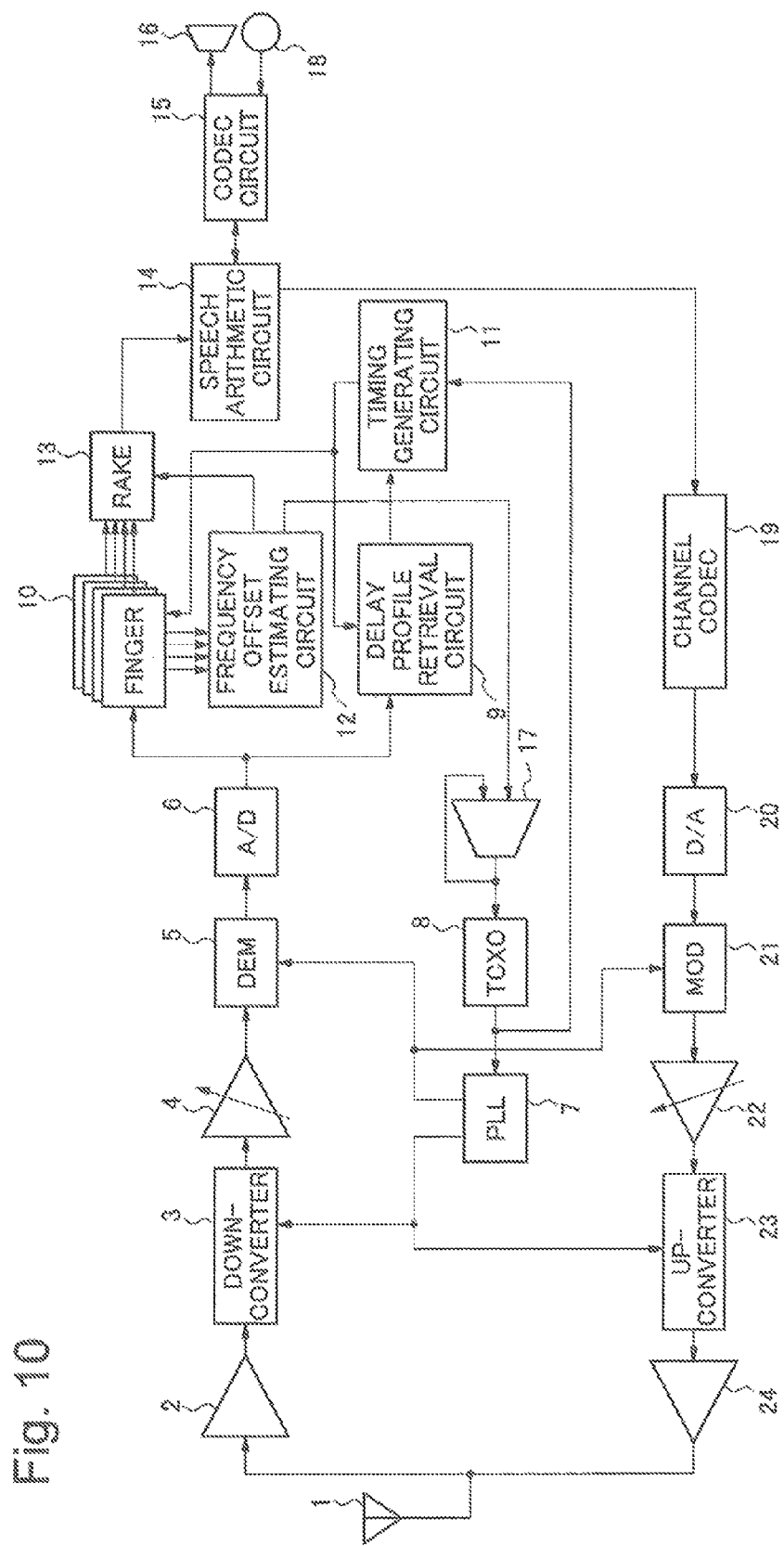
FIG. 10 is a block diagram showing the electrical configuration of the conventional CDMA system cellular phone.
Figure 12A:
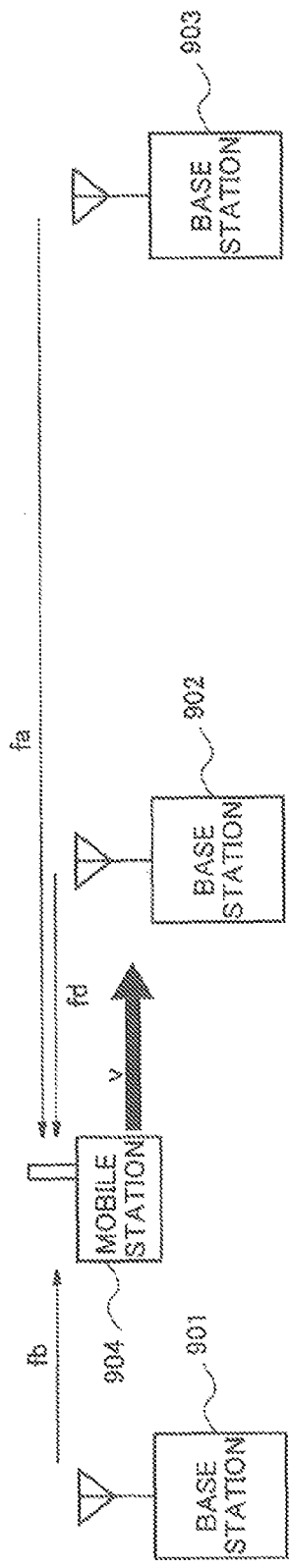
FIG. 12A and FIG. 12B are operation explanation drawings illustrating a conventional art.
Figure 12B:
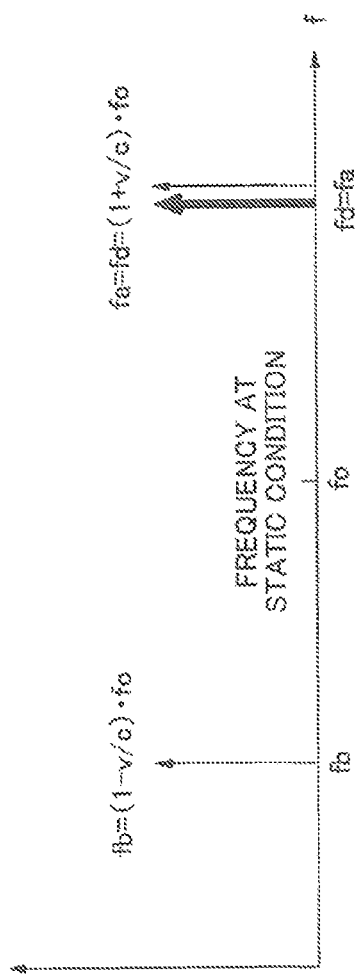
Figure 13A:
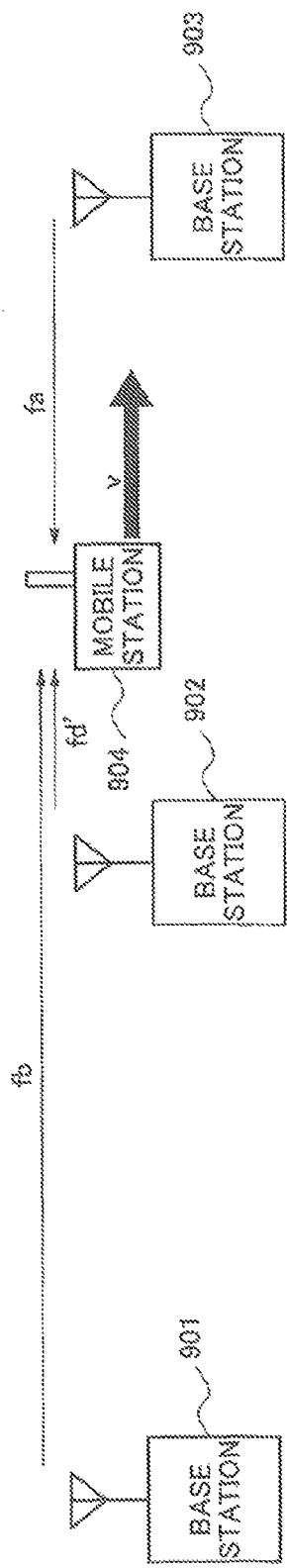
FIG. 13A and FIG. 13B are figures showing a drawback caused by Doppler effect in a conventional art.
Figure 13B:
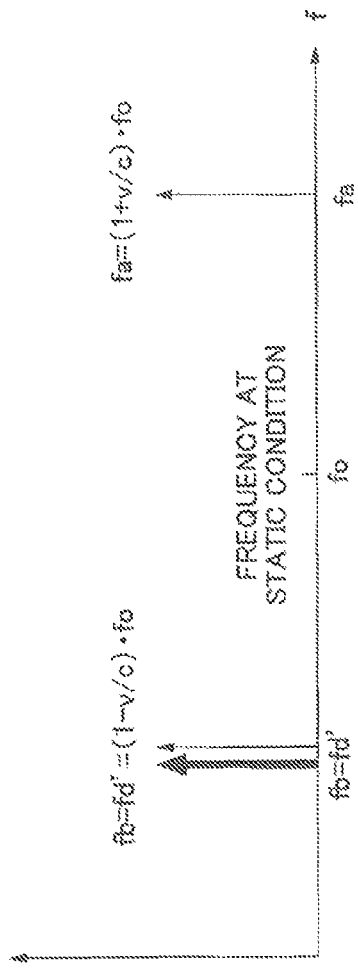

FIG. 9 is a figure showing the composition of the mobile station 804 according to the fifth embodiment of the present invention. An operation of the mobile station 804 of the embodiment 5 will be described with reference to this figure.

The mobile station 804 includes detecting means 805 and selecting means 806. The detecting means 805 detects changes in relative positions to a plurality of base stations. The selecting means 806 selects a downlink signal transmission base station which is suitable for transmitting a downlink signal to the mobile station 804 from among a plurality of base stations based on the relative positions detected by the detecting means 805, and also selects an uplink signal reception base station which is suitable for receiving an uplink signal from the mobile station 804.

As above, according to this embodiment 5, the detecting means 805 of the mobile station 804 detects changes in relative positions to a plurality of base stations, and the selecting means 806 selects the downlink signal transmission base station which transmits the downlink signal from among a plurality of base stations based on the relative positions detected by the detecting means 805 and also selects the uplink signal reception base station which receives the uplink signal. By this configuration, the effect, in which good communication can be realized without causing increase in the amount of operation for a correction process and increase in the amount of power consumption and heat emission produced by that, is obtained. The effect, in which throughput of the signal processing does not degrade, is also obtained because the above-mentioned correction process becomes unnecessary.

Although the embodiments of the present invention have been explained in detail with reference to the drawings above, each configuration in detail is not limited to each embodiment, and even if there is change or the like in the design in the range that does not deviate from the gist of the present invention, it is included in the present invention. For example, according to each above-mentioned embodiment, although it is described about a case in which the mobile station receives the downlink signal from the base station locating ahead of the moving course of the mobile station and transmits the uplink signal to the base station locating behind the moving course, it is not limited to this. It is possible to cancel frequency shift by Doppler effect, similarly to each embodiment described above, even in a case in which the mobile station receives the downlink signal from the base station locating behind the moving course of the mobile station, and transmits the uplink signal to the base station locating in front of the moving course.

According to each embodiment mentioned above, for example, the mobile station detects frequency shift by Doppler effect occurring in a receiving frequency, or the mobile station detects changes in relative positions using a plurality of directional antennas. And, based on this detection result, the mobile station selects the downlink signal transmission base station which transmits a downlink signal from among a plurality of base stations and designates the uplink signal reception base station which receives an uplink signal. However, it is not limited to this. For example, the mobile station may detect changes in relative positions by detecting a relative speed with each base station. For example, instead of the mobile station, a base station network may detect frequency shift by Doppler effect occurring in a receiving frequency, or may detect changes in relative positions by detecting a relative speed of the mobile station to each base station, and based on this detection result, the downlink signal transmission base station which transmits a downlink signal may be selected from among a plurality of base stations, and the uplink signal reception base station which receives an uplink signal may be designated.

FIELD OF INDUSTRIAL APPLICATION

A mobile radio communication system according to the present invention can be applied to a cellular phone and a car radio or the like.

The invention claimed is:

1. A mobile station, comprising:
   a detector for detecting changes in distances between the mobile station and a plurality of base stations; and
   a selector for selecting an uplink signal reception base station which receives an uplink signal, and, based on the changes in the distances detected by said detector, selecting at least one downlink signal transmission base station which transmits a downlink signal to the mobile station and whose increase and decrease of the change in the distance to the mobile station is opposite to the uplink signal reception base station.

2. The mobile station according to claim 1, wherein said selector selects said downlink signal transmission base station from among said base stations which the mobile station is approaching or moving away from, and selects said uplink signal reception base station from among said base stations from which the mobile station is moving away from when said downlink signal transmission base station is selected from among said base stations which the mobile station is approaching and selects said uplink signal reception base station from among said base stations from which the mobile station is approaching when said downlink signal transmission base station is selected from among said base stations which the mobile station is moving away from.

3. The mobile station according to claim 1, further comprising:
   a memory for holding positional relationship information on said plurality of base stations in advance,
   wherein said detector detects changes in the distances to said plurality of base stations based on the positional relationship information held in said memory.

4. The mobile station according to claim 1, wherein said detector detects a frequency shift which occurs to a downlink signal received from each of said base stations and detects changes in the distances based on the frequency shift.

5. The mobile station according to claim 1, further comprising:
a first antenna having directivity in front of a moving direction; and
a second antenna having directivity behind the moving direction,
wherein said detector detects changes in the distances to said plurality of base stations based on a signal which said first antenna and said second antenna receive.

6. The mobile station according to claim 4, wherein said selector selects said downlink signal transmission base station from among said base stations in which a frequency shift to an increasing direction or decreasing direction is occurring in a frequency of a received downlink signal, and selects said uplink signal reception base station from among said base stations in which a frequency shift to the opposite direction compared with the frequency shift occurring in said selected downlink signal transmission base station is occurring in a frequency of the received downlink signal.

7. The mobile station according to claim 6, further comprising:
a frequency setter for setting a receiving frequency and a transmitting frequency so as to receive a downlink signal having a frequency used by said selected downlink signal transmission base station, and transmit an uplink signal having a frequency used by said selected uplink signal reception base station.

8. The mobile station according to claim 6, further comprising:
a code setter for setting a receiving signal code and a transmitting signal code so as to receive a downlink signal which is encoded by a code used by said selected downlink signal transmission base station, and transmit an uplink signal which is encoded by a code used by said selected uplink signal reception base station.

9. A mobile radio communication system including a plurality of base stations and a mobile station which communicates with each of the base stations, the system comprising:
a detector for detecting changes in distances between the mobile station and the plurality of base stations; and
a selector for selecting an uplink signal reception base station which receives an uplink signal, and, based on the changes in the distances detected by said detector, selecting at least one downlink signal transmission base station which transmits a downlink signal to the mobile station and whose increase and decrease of the change in the distance to the mobile station is opposite to the uplink signal reception base station.

10. The mobile radio communication system according to claim 9, wherein said selector selects said downlink signal transmission base station from among said base stations which the mobile station is approaching or moving away from, and selects said uplink signal reception base station from among said base stations from which the mobile station is moving away from when said downlink signal transmission base station is selected from among said base stations which the mobile station is approaching and selects said uplink signal reception base station from among said base stations from which the mobile station is approaching when said downlink signal transmission base station is selected from among said base stations which the mobile station is moving away from.

11. The mobile radio communication system according to claim 9, further comprising:
a memory for holding positional relationship information on said plurality of base stations in advance,
wherein said detector detects changes in the distances to said plurality of base stations based on the positional relationship information held in said memory.

12. The mobile radio communication system according to claim 9, wherein said detector detects a frequency shift which occurs to a downlink signal received from each of said base stations, and detects changes in the distances based on the frequency shift.

13. The mobile radio communication system according to claim 9, wherein said mobile station includes a first antenna having directivity in front of a moving direction, and a second antenna having directivity behind the moving direction,
wherein said detector detects changes in the distances to said plurality of base stations based on a signal which said first antenna and said second antenna receive.

14. The mobile radio communication system according to claim 12, wherein said selector selects said downlink signal transmission base station from among said base stations in which a frequency shift to an increasing direction or a decreasing direction is occurring in a frequency of a received downlink signal, and selects said uplink signal reception base station from among said base stations in which a frequency shift to the opposite direction compared with the frequency shift occurring in said selected downlink signal transmission base station is occurring in a frequency of the received downlink signal.

15. The mobile radio communication system according to claim 14, said mobile station further comprising:
a frequency setter for setting a receiving frequency and a transmitting frequency so as to receive a downlink signal having a frequency used by said selected downlink signal transmission base station, and transmit an uplink signal having a frequency used by said selected uplink signal reception base station.

16. The mobile radio communication system according to claim 14, said mobile station further comprising:
a code setter for setting a receiving signal code and a transmitting signal code so as to receive a downlink signal which is encoded by a code used by said selected downlink signal transmission base station, and transmit an uplink signal which is encoded by a code used by said selected uplink signal reception base station.

17. A mobile radio communication method including a plurality of base stations and a mobile station which communicates with each of the base stations, the method comprising:
detecting changes in distances between the mobile station and said plurality of base stations;
selecting an uplink signal reception base station which receives an uplink signal; and
selecting at least one downlink signal transmission base station which transmits a downlink signal to the mobile station and whose increase and decrease of the change in the distance to the mobile station is opposite to the uplink signal reception base station, based on the detected changes in the distances.

18. The mobile radio communication method according to claim 17, further comprising:
selecting said downlink signal transmission base station from among said base stations which the mobile station is approaching or moving away from;
selecting said uplink signal reception base station from among said base stations from which the mobile station is moving away from when said downlink signal transmission base station is selected from among said base stations which the mobile station is approaching; and selecting said uplink signal reception base station from among said base stations from which the mobile station is approaching when said downlink signal transmission base station is selected from among said base stations which the mobile station is moving away from.

19. The mobile radio communication method according to claim 17, further comprising:

holding positional relationship information on said plurality of base stations in advance; and detecting changes in the distances to said plurality of base stations based on the held positional relationship information.

20. The mobile radio communication method according to claim 17, further comprising:

detecting a frequency shift which occurs to a downlink signal received from each of said base stations; and detecting changes in the distances based on the frequency shift.

21. The mobile station according to claim 1, further comprising:

a circuit that changes a reference clock frequency in the mobile station so that the reference clock frequency follows a reference clock frequency superposed on the downlink signal, and generates the uplink signal based on the reference clock frequency.

* * * * *